(12) United States Patent
Nemoto

(10) Patent No.: US 11,445,166 B2
(45) Date of Patent: Sep. 13, 2022

(54) IMAGE PROJECTION SYSTEM, IMAGE PROJECTION APPARATUS, IMAGE DISPLAY LIGHT DIFFRACTION OPTICAL ELEMENT, TOOL, AND IMAGE PROJECTION METHOD

(71) Applicant: Sony Semiconductor Solutions Corporation, Kanagawa (JP)

(72) Inventor: Kazuhiko Nemoto, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/059,623

(22) PCT Filed: Apr. 10, 2019

(86) PCT No.: PCT/JP2019/015641
§ 371 (c)(1),
(2) Date: Nov. 30, 2020

(87) PCT Pub. No.: WO2019/235059
PCT Pub. Date: Dec. 12, 2019

(65) Prior Publication Data
US 2021/0227199 A1  Jul. 22, 2021

(30) Foreign Application Priority Data

Jun. 5, 2018 (JP) .............................. JP2018-107519

(51) Int. Cl.
*H04N 13/344* (2018.01)
*H04N 13/363* (2018.01)
(Continued)

(52) U.S. Cl.
CPC ....... *H04N 13/344* (2018.05); *G02B 27/0172* (2013.01); *H04N 9/3152* (2013.01);
(Continued)

(58) Field of Classification Search
CPC .. H04N 13/344; H04N 9/3152; H04N 13/111; H04N 13/363; H04N 9/3173;
(Continued)

(56) References Cited

U.S. PATENT DOCUMENTS 8,390,533 B2   3/2013   Yamamoto
9,430,878 B2 * 8/2016   Li ........................ G06F 3/04815
(Continued)

FOREIGN PATENT DOCUMENTS

CN   102547340 A   7/2012
CN   105572877 A   5/2016
(Continued)

OTHER PUBLICATIONS

International Search Report issued in International Patent Application No. PCT/JP2019/015641 dated Jul. 2, 2019 and English translation of same. 4 pages.

(Continued)

*Primary Examiner* — Michael Lee
(74) *Attorney, Agent, or Firm* — K&L Gates LLP

(57) ABSTRACT

An object is to provide an image projection system in which a size and weight of a head-mounted portion are reduced and binocular vision is enabled.
The present technology provides an image projection system including an image projection apparatus and an image display light diffraction optical element separated from the image projection apparatus and arranged in front of each of the two eyes, and the image projection apparatus includes: a positional information acquisition unit that acquires three-dimensional positional information of the image display light diffraction optical element provided in front of each of two eyes; an image display light adjustment unit that adjusts projected image display light on the basis of the three-dimensional positional information acquired by the posi- (Continued)

tional information acquisition unit; and one projection optical system that can project the image display light to a region covering the two eyes and projects, toward the image display light diffraction optical elements, the image display light adjusted by the image display light adjustment unit.

17 Claims, 10 Drawing Sheets

(51) Int. Cl.
*H04N 13/111* (2018.01)
*G02B 27/01* (2006.01)
*H04N 9/31* (2006.01)

(52) U.S. Cl.
CPC ......... *H04N 13/111* (2018.05); *H04N 13/363* (2018.05); *G02B 2027/0174* (2013.01); *H04N 9/3173* (2013.01)

(58) Field of Classification Search
CPC .. H04N 9/3129; H04N 9/3179; H04N 9/3194; G02B 27/0172; G02B 2027/0174; G02B 27/0093; G02B 2027/0187; G02B 5/32; G03B 21/14; G09G 5/00
USPC ....................................................... 348/744
See application file for complete search history.

(56) References Cited

U.S. PATENT DOCUMENTS

| | | | |
|---|---|---|---|
| 2002/0060649 A1 | 5/2002 | Perlman | |
| 2004/0145539 A1* | 7/2004 | Okamoto | H04N 13/344 345/8 |
| 2011/0083106 A1* | 4/2011 | Hamagishi | G06F 3/04815 715/836 |
| 2012/0154909 A1* | 6/2012 | Fukami | G02B 27/0093 359/464 |
| 2013/0222642 A1* | 8/2013 | Watanabe | H04N 5/2354 348/234 |
| 2014/0132787 A1* | 5/2014 | Lin | G06F 3/0346 348/211.99 |
| 2016/0292850 A1* | 10/2016 | Perez | A63F 13/422 |
| 2017/0031435 A1* | 2/2017 | Raffle | G06K 9/00597 |
| 2017/0178359 A1* | 6/2017 | Spiessl | G06F 3/011 |
| 2018/0107273 A1* | 4/2018 | Raffle | G06K 9/00604 |
| 2019/0068958 A1* | 2/2019 | Kim | H04N 13/322 |
| 2019/0206082 A1* | 7/2019 | Hakoshima | G06K 9/00604 |
| 2020/0169678 A1* | 5/2020 | Kang | B60W 50/08 |

FOREIGN PATENT DOCUMENTS

| | | |
|---|---|---|
| JP | 2006-053321 A | 2/2006 |
| JP | 2006-098820 A | 4/2006 |
| JP | 2013-044833 A | 3/2013 |
| WO | WO2009066446 A1 | 5/2009 |

OTHER PUBLICATIONS

Written Opinion issued in International Patent Application No. PCT/JP2019/015641 dated Jul. 2, 2019. 4 pages.

* cited by examiner

IMAGE PROJECTION SYSTEM, IMAGE PROJECTION APPARATUS, IMAGE DISPLAY LIGHT DIFFRACTION OPTICAL ELEMENT, TOOL, AND IMAGE PROJECTION METHOD

TECHNICAL FIELD

The present technology relates to an image projection system, an image projection apparatus, an image display light diffraction optical element, a tool, and an image projection method. More specifically, the present technology relates to an image projection system, respective elements constituting the image projection system, and an image projection method in the image projection system, in which the image projection system includes: an image display light diffraction optical element arranged in front of each of two eyes; and an image projection apparatus that is separated from the image display light diffraction optical elements and projects image display light toward the image display light diffraction optical elements.

BACKGROUND ART

In recent years, great attention is drawn to a technology in which an image is displayed in a manner superimposed on a scene of an external world such as real scenery or the like. The technology is also called augmented reality (AR) technology. One of products utilizing this technology is a head-mounted display. The head-mounted display is used by a user mounting the head-mounted display on his/her head. In an image display method using the head-mounted display, for example, not only light from the external world but also light from the head-mounted display reaches eyes of the user, and as a result thereof, the user recognizes, in a manner superimposed on an image of the external world, an image formed by the light from the display.

One of the head-mounted displays is an eyeglass-type display, and various kinds of eyeglass-type display have been proposed.

Many eyeglass-type displays each having an image projection apparatus built inside have been proposed so far. The eyeglass-type display has a configuration in which light projected from an image projection apparatus built inside each eyeglass is guided to an eye through an optical system inside the eyeglass. For example, Patent Document 1 below discloses such an eyeglass-type display. Specifically, Patent Document 1 below discloses a head-mounted display that displays a picture image to an observer in a head-mounted state in which the head-mounted display is mounted on the observer's head, and the head-mounted display includes a monocular display unit that displays the picture image to the observer by projecting, to an observation eye that is one of eyes of the observer, picture image light corresponding to a picture image signal to display the picture image.

Furthermore, an eyeglass-type display in which the image projection apparatus is separated from a head-mounted portion, such as eyeglasses or the like, has been also proposed. For example, an eyeball projection type display apparatus disclosed in Patent Document 2 below includes: a projection optical means that emits light flux emitted from a picture image generating means; and an eyepiece optical means which condenses the light flux from the projection optical means to form an exit pupil, and forms a picture on a retina located near the exit pupil inside an eyeball of a using person. The projection optical means is provided apart from the eyepiece optical means, and only the eyepiece optical means is provided near the eyeball of the using person.

CITATION LIST

Patent Document

Patent Document 1: Japanese Patent Application Laid-Open No. 2013-44833
Patent Document 2: Japanese Patent Application Laid-Open No. 2006-98820

SUMMARY OF THE INVENTION

Problems to be Solved by the Invention

Among constituent elements of a head-mounted display, it is desirable that a head-mounted portion be small-sized and/or lightweight in order to reduce a burden on a user. Reducing a size and/or weight of the head-mounted portion is important also from viewpoints of cost reduction and improvement in design of the head-mounted display.

Furthermore, it is desirable to project, to a user, image display light that enables binocular vision in order that the user can recognize a natural image, particularly a stereoscopic image. However, there may be a case where an apparatus becomes complex in order to project, to the user, the image display light that enables the binocular vision. The more complex the apparatus is, the more difficult reducing the size and/or the weight of the apparatus is.

The present technology is directed to reducing a size and/or weight of the head-mounted portion out of the constituent elements of the head-mounted display. Furthermore, the present technology is also directed to providing a technology that enables the binocular vision.

Solutions to Problems

The present technology provides an image projection system including:
an image projection apparatus that includes: a positional information acquisition unit that acquires three-dimensional positional information of an image display light diffraction optical element provided in front of each of two eyes; an image display light adjustment unit that adjusts projected image display light on the basis of the three-dimensional positional information acquired by the positional information acquisition unit; and one projection optical system that can project the image display light to a region covering the two eyes and projects, toward the image display light diffraction optical elements, the image display light adjusted by the image display light adjustment unit; and the image display light diffraction optical elements separated from the image projection apparatus and arranged in front of the two eyes, respectively.

According to one aspect of the present technology, the image display light diffraction optical element has optical characteristics of: functioning as a lens for light having a wavelength range of the image display light; and transmitting light having a wavelength out of the wavelength range.

According to the one aspect of the present technology, the projection optical system irradiates two eyes with the image display light by a magnification optical system.

According to another aspect of the present technology, the projection optical system may condense the image display light in a vicinity of a pupillary orifice and irradiate a retina with the image display light so as to obtain a Maxwell view.

According to the one aspect of the present technology, the projection optical system may divide, into two, a region to which image display light can be projected, and the two regions can cover right and left eyes, respectively.

According to the one aspect of the present technology, the projection optical system can include a wedge plate, a dogleg shape mirror, or a diffraction element as an optical element for the division.

According to the one aspect of the present technology, the projection optical system may divide, into two, a region to which image display light can be projected, the two regions cover right and left eyes, respectively, and the projection optical system can include a deflection control unit that deflects the projected image display light.

According to the one aspect of the present technology, the image display light diffraction optical element is included in a tool adapted to hold the optical element in front of the two eyes.

According to the one aspect of the present technology, the tool does not include a projection optical system.

According to the one aspect of the present technology, the positional information acquisition unit includes an image sensor, and the positional information acquisition unit can acquire the three-dimensional positional information on the basis of information acquired by the image sensor.

According to the one aspect of the present technology, the image display light adjustment unit may adjust the image display light such that different rays of the image display light are projected to the two eyes, respectively.

According to the one aspect of the present technology, the image display light adjustment unit can adjust the image display light on the basis of parallax between the two eyes.

According to the one aspect of the present technology, a user of the image projection system can recognize a three-dimensional position of a presented image by projecting the different rays of the image display light to the two eyes, respectively.

Furthermore, the present technology also provides an image projection apparatus including: a positional information acquisition unit that acquires three-dimensional positional information of an image display light diffraction optical element provided in front of each of two eyes; an image display light adjustment unit that adjusts projected image display light on the basis of the three-dimensional positional information acquired by the positional information acquisition unit; and one projection optical system that can project the image display light to a region covering the two eyes and projects, toward the image display light diffraction optical elements, the image display light adjusted by the image display light adjustment unit.

Furthermore, the present technology also provides an image display light diffraction optical element used to diffract image display light and make the image display light reach each of two eyes, in which the image display light is projected from an image projection apparatus that includes: a positional information acquisition unit that acquires three-dimensional positional information of the image display light diffraction optical element provided in front of each of the two eyes; an image display light adjustment unit that adjusts projected image display light on the basis of the three-dimensional positional information acquired by the positional information acquisition unit; and one projection optical system that can project the image display light to a region covering the two eyes and projects, toward the image display light diffraction optical elements, the image display light adjusted by the image display light adjustment unit, in which the image display light diffraction optical elements are separated from the image projection apparatus and arranged in front of the two eyes, respectively.

Furthermore, the present technology also provides a tool including: an image display light diffraction optical element adapted to diffract image display light and make the image display light reach two eyes, in which the image display light is projected from an image projection apparatus that includes: a positional information acquisition unit that acquires three-dimensional positional information of the image display light diffraction optical element provided in front of each of two eyes; an image display light adjustment unit that adjusts the projected image display light on the basis of the three-dimensional positional information acquired by the positional information acquisition unit; and one projection optical system that can project the image display light to a region covering the two eyes and projects, toward the image display light diffraction optical elements, the image display light adjusted by the image display light adjustment unit, in which the tool is separated from the image projection apparatus and adapted to hold the optical element in front of the two eyes.

Furthermore, the present technology provides an image projection method including: a positional information acquisition process of acquiring three-dimensional positional information of an image display light diffraction optical element provided in front of each of two eyes; an image display light adjustment process of adjusting projected image display light on the basis of the three-dimensional positional information acquired in the positional information acquisition process; and a projection process of projecting the image display light from one projection optical system toward the image display light diffraction optical elements within a region covering the two eyes, the image display light having been adjusted in the image display light adjustment process, in which the image display light diffraction optical elements are separated from the image projection apparatus and arranged in front of the two eyes, respectively.

Effects of the Invention

The present technology provides a head-mounted display in which a size and/or the weight of a head-mounted portion are reduced and the binocular vision is enabled. Therefore, it is possible to: reduce a burden on a user of the head-mounted portion of the head-mounted display; and present a natural image to the user.

Note that effects exerted by the present technology are not constantly limited to the effects recited herein and may include any effect recited in the present specification.

MODE FOR CARRYING OUT THE INVENTION

Figure 1:
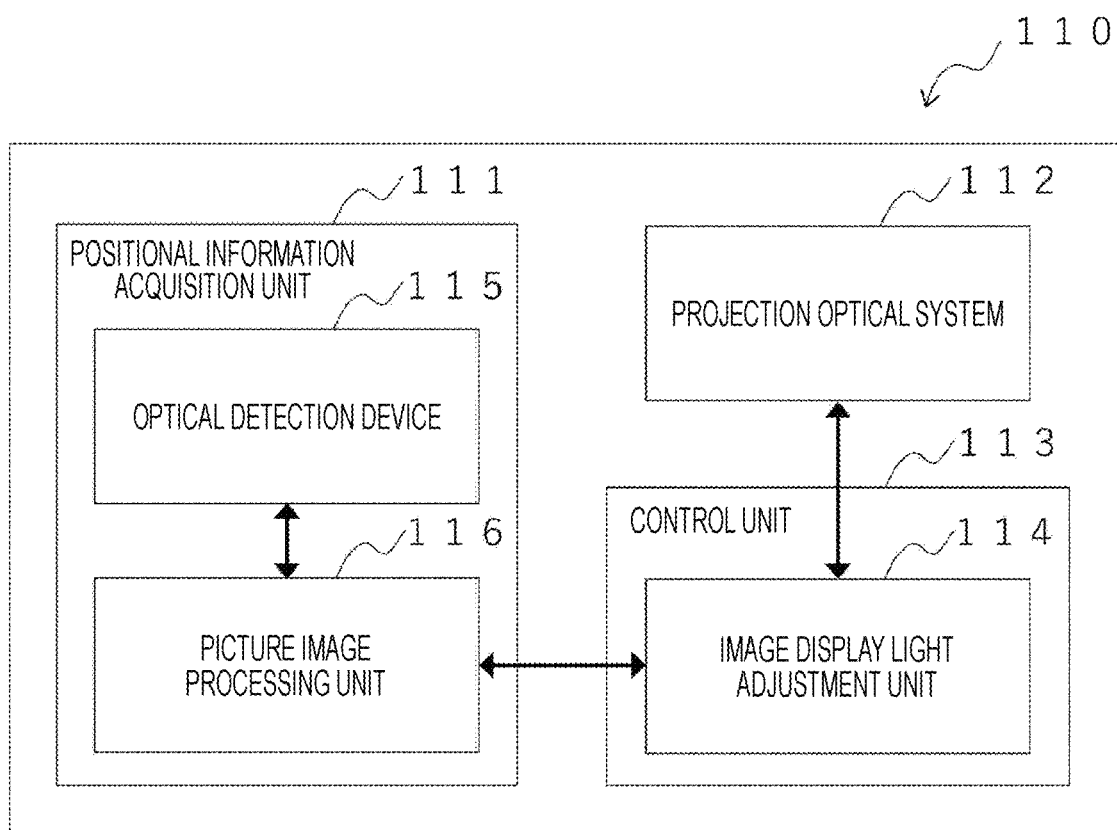
FIG. 1 is an exemplary block diagram of an image projection apparatus constituting an image projection system according to the present technology.

In the following, a preferable mode to carry out the present technology will be described. Note that embodiments described below illustrate representative embodiments of the present technology and the scope of the present technology is not limited to these embodiments. Note that the present technology will be described in the following order.

1. First Embodiment (Image Projection System)
(1) Description of First Embodiment
(2) First Example of First Embodiment (Image Projection System)
(3) Second Example of First Embodiment (Exemplary Way of Projecting Image Display Light)
(4) Third Example of First Embodiment (Exemplary Way of Projecting Image Display Light)
(5) Fourth Example of First Embodiment (Exemplary Way of Projecting Image Display Light)
(6) Fifth Example of First Embodiment (Exemplary Configuration of Image Projection Apparatus)
2. Second Embodiment (Image Projection Apparatus)
3. Third Embodiment (Image Display Light Diffraction Optical Element)
4. Fourth Embodiment (Tool Including Image Display Light Diffraction Optical Element)
5. Fifth Embodiment (Image Projection Method)
(1) Description of Fifth Embodiment
(2) Example of Fifth Embodiment (Image Projection Method)

1. First Embodiment (Image Projection System)

(1) Description of First Embodiment

An image projection system according to the present technology includes: an image projection apparatus; and an image display light diffraction optical element separated from the image projection apparatus. The image projection apparatus includes a projection optical system, and image display light is projected from the image projection apparatus toward the image display light diffraction optical element provided in front of each of two eyes. [Therefore, a tool (such as eyeglasses, a helmet, and the like) mounted on a head and adapted to hold the image display light diffraction optical element in front of each of the two eyes may not need to include any projection optical system, and furthermore, the tool may not need to include elements required to project the image display light (e.g., the projection optical system, a power source, an apparatus driven by electric power, and the like). With this configuration, a size and/or weight of the tool can be reduced and a burden on a user can be reduced.

Furthermore, due to such reduction in the size and the weight of the tool, a cost of the tool can also be reduced, and moreover, a degree of freedom in designing the tool is increased.

A head-mounted display disclosed in Patent Document 1 described above includes a monocular display unit that displays a picture image to an observer, and the display unit is mounted on a frame to be mounted on a head. The display unit includes a hollow housing, and a picture image light forming unit is housed in the housing. That is, the head-mounted display disclosed in Patent Document 1 described above has a configuration in which a constituent element to form image display light is mounted on the frame mounted on the head. Since the head-mounted display includes this constituent element, it is difficult to reduce a size or weight.

In the image projection system according to the present technology, the elements required to project the image display light are not necessarily included in the tool mounted on the head as described above. Therefore, according to the present technology, the size and/or the weight of the tool mounted on the head can be reduced.

Furthermore, the image projection apparatus included in the image projection system of the present technology includes one projection optical system, and the projection optical system can project the image display light to a region covering two eyes. In the present technology, the region where the image display light can be projected from the one projection optical system will be also referred to as an "image projectable region". The image display light is adjusted by an image display light adjustment unit on the basis of three-dimensional positional information of the image display light diffraction optical elements acquired by a positional information acquisition unit In the image projection system of the present technology, the image display light adjusted as described above is projected by the one projection optical system that can project the image display light to the region covering the two eyes. Therefore, the image display light that enables binocular vision can be projected from the one projection optical system. As a result, it is possible to present a natural image to a user by the image projection apparatus having a simple configuration.

An eyeball projection type display apparatus disclosed in Patent Document 2 described above includes a projection optical means and an eyepiece optical means, the projection optical means is provided apart from the eyepiece optical means, and only the eyepiece optical means is provided near an eyeball of a using person. However, Patent Document 2 described above does not disclose a specific configuration to enable binocular vision. It is conceivable to provide two lines of the projection optical means of the display apparatus for a right eye and a left eye, respectively, but in that case, a size and a cost of the display apparatus are increased. In the image projection system of the present technology, the image display light adjusted as described above is projected to the image display light diffraction optical elements from the one projection optical system that can project the image display light to the region covering the two eyes, and then, the image display light reaches the two eyes. Therefore, the image display light that enables binocular vision can be projected from the one projection optical system.

(2) First Example of First Embodiment (Image Projection System)

Figure 2:
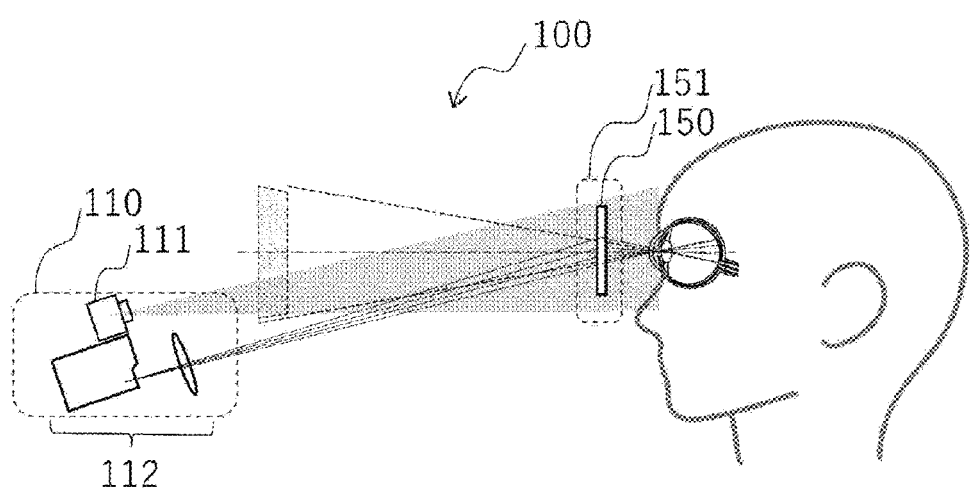
FIG. 2 is a view illustrating an exemplary state in which a user utilizes the image projection system according to the present technology.

Hereinafter, an example of the image projection system according to the present technology will be described with reference to FIGS. 1 and 2. FIG. 1 is an exemplary block diagram of the image projection apparatus constituting the image projection system according to the present technology. FIG. 2 is a view illustrating an exemplary state in which a user utilizes the optical image projection system according to the present technology.

As illustrated in FIG. 1, an image projection apparatus 110 includes a positional information acquisition unit 111, a projection optical system 112, and a control unit 113. The control unit 113 includes an image display light adjustment unit 114. As illustrated in FIG. 2, an image display light diffraction optical element 150 is arranged in front of each of two eyes of a user who utilizes the image projection system 100. The image display light diffraction optical element 150 is arranged in front of each of the two eyes of the user by a tool 151. The tool 151 includes, for example, eyeglasses mounted on a head of the user. Hereinafter, the respective constituent elements will be described.

The positional information acquisition unit 111 acquires three-dimensional positional information of the image display light diffraction optical element 150 provided in front of each of the two eyes. The three-dimensional positional information may include, for example, three-dimensional positional information of an image display light diffraction optical element 150 with respect to the image projection apparatus 110, and preferably, three-dimensional positional information of the image display light diffraction optical element 150 with respect to the projection optical system 112.

More preferably, the image display light diffraction optical element 150 is provided in front of each of right and left eyes, and the three-dimensional positional information may include positional information of each of the image display light diffraction optical elements 150 with respect to the image projection apparatus 110 (particularly, the projection optical system 112). That is, the three-dimensional positional information can include positional information related to each of the image display light diffraction optical elements in front of the left eye and the image display light diffraction optical element in front of the right eye. With this configuration, it is possible to adjust the image display light based on parallax between the right and left eyes, and not only a planar image but also a stereoscopic or three-dimensional image can be presented to a user.

More specifically, the three-dimensional positional information may include, for example, any one of or any two or more of following pieces of information:

a distance from the image projection apparatus 110 (particularly, the projection optical system 112) to an image display light diffraction optical element 150, particularly, a distance to the image display light diffraction optical element 150 in front of each of right and left eyes;

a direction of an image display light diffraction optical element 150 with respect to the image projection apparatus 110 (particularly, the projection optical system 112), particularly, a direction of the image display light diffraction optical element 150 in front of each of the right and left eyes;

an orientation of a surface of an image display light diffraction optical element 150 with respect to the image projection apparatus 110 (particularly, the projection optical system 112), an orientation of the surface of the image display light diffraction optical element 150 in front of each of the right and left eyes); and a relation associated with positions between the two image display light diffraction optical elements 150 in front of the right and left eyes, for example, a position of the image display light diffraction optical element in front of the left eye with respect to the image display light diffraction optical element in front of the right eye, a position of the image display light diffraction optical element in front of the right eye with respect to the image display light diffraction optical element in front of the left eyes, or the like.

The positional information acquisition unit 111 can preferably acquire the three-dimensional positional information of the two eyes, more preferably, the three-dimensional positional information of pupillary orifices of the two eyes. Utilizing both the three-dimensional positional information of the image display light diffraction optical elements and the three-dimensional positional information of the two eyes, the image display light adjustment unit 114 can adjust the image display light on the basis of the three-dimensional positional information of the two eyes with respect to the image display light diffraction optical elements. With this configuration, the image display light can be adjusted to become more suitable for a user.

The three-dimensional positional information of the two eyes (particularly, the pupillary orifices of the two eyes) can include, for example, the three-dimensional positional information with respect to the image display light diffraction optical elements 150. The three-dimensional positional information of the two eyes more particularly can include: positional information of the left eye with respect to the image display light diffraction optical element in front of the left eye; and positional information of the right eye with respect to the image display light diffraction optical element in front of the right eye.

Furthermore, the three-dimensional positional information of the two eyes (particularly, the pupillary orifices of the two eyes) can include information associated with a positional relation between the right and left eyes. The positional relation information between the right and left eyes can include, for example, a distance between the right and left eyes (particularly, a distance between the pupillary orifices of the right and left eyes) and/or mutual positional information between the right and left eyes.

Furthermore, the three-dimensional positional information of the two eyes can include information associated with sizes of the pupillary orifices of the right and left eyes. The information can include, for example, a diameter or a radius of each pupillary orifice and/or the area of each pupillary orifice.

The positional information acquisition unit 111 can include an optical detection device 115 such as an image sensor or the like. As the image sensor, a CMOS or a CCD may be used, for example. The optical detection device 115 can acquire a picture image of the image display light diffraction optical elements 150 provided in front of the two eyes. That is, in the present technology, the positional information acquisition unit 111 includes the image sensor and can acquire the three-dimensional positional information of each of the image display light diffraction optical elements 150 on the basis of information acquired by the image sensor, particularly, picture image information. The three-dimensional positional information can be acquired by the picture image processing unit 116 included in the positional information acquisition unit 111.

Furthermore, the picture image usually includes a picture image of the two eyes. Therefore, the positional information acquisition unit 111 (particularly, the picture image processing unit 116) can acquire the three-dimensional positional information of the two eyes from the picture images.

In FIG. 1, the picture image processing unit 116 is illustrated as a separate configuration from the control unit 113, but the picture image processing unit 116 may be included in the control unit 113.

According to the one aspect of the present technology, the picture image processing unit 116 can acquire the three-dimensional positional information of each image display light diffraction optical element 150 by a technology using a mark. For example, a mark for the picture image processing unit 116 to acquire three-dimensional positional information can be provided in a part of or a periphery of each image display light diffraction optical element 150 The picture image processing unit 116 recognizes the mark in a picture image and can acquire the three-dimensional positional information of each image display light diffraction optical element 150.

According to another aspect of the present technology, the picture image processing unit 116 can acquire the three-dimensional positional information of the two eyes by a pupil recognition technology. As the pupil recognition technology, a known technology in this technical field may be used.

Furthermore, the picture image processing unit 116 may acquire the three-dimensional positional information of the image display light diffraction optical elements and/or the two eyes by three-dimensionally measuring and/or learning each image display light diffraction optical element and/or the two eyes.

According to one of the preferred aspects of the present technology, the positional information acquisition unit 111 can acquire the three-dimensional positional information of the image display light diffraction optical elements and/or the two eyes in real time. The image display light can be accurately projected by utilizing the three-dimensional positional information acquired in real time.

The image projection apparatus 110 includes one projection optical system 112, and the projection optical system 112 can project the image display light to the region covering the two eyes. In the present technology, having the one projection optical system can mean that the image display light that should reach each of the right eye and the left eye is projected from the same projection optical system. For example, having the one projection optical system may mean that there is one projection port used to project the image display light that should reach each of the two eyes. For example, having the one projection optical system may mean that a light source to project the image display light that should reach each of the two eyes is the same. Since the image projection apparatus constituting the image projection system of the present technology includes only the one projection optical system, a size and/or a cost of the image projection apparatus can be reduced.

The image display light projected from the projection optical system 112 may include light emitted by an LED or a CRT. The image display light can include laser light, for example.

Preferably, the projection optical system 112 can include an optical zoom adjustment unit. With this configuration, a focus of a projected image can be adjusted.

In the present technology, more preferably, the image projectable region of the one projection optical system is set such that the three-dimensional positions of the image display light diffraction optical elements are located in this region even when the three-dimensional positions are changed due to a shaky movement and the like of a face or a hand, for example. With this configuration, even when the three-dimensional positions of the image display light diffraction optical elements are changed in an upper-lower direction, a right-left direction, or a front-back direction, the image display light adjustment unit adjusts the image display light, and as a result, the image display light can be projected to the positions after the change.

The projection optical system 112 can project, toward the image display light diffraction optical elements 150, the image display light adjusted by the image display light adjustment unit 114. A type of the projection optical system adopted in the present technology may be appropriately selected by a person skilled in the art in accordance with, for example, a product concept or the like.

According to the one aspect of the present technology, the projection optical system 112 projects the image display light to the two eyes by a magnification optical system. The magnification optical system is an optical system adopted in, for example, a microscope, a telescope, and the like. According to another aspect of the present technology, the projection optical system 112 may condense the image display light in the vicinity of a pupillary orifice, and then a retina is irradiated with the image display light so as to obtain a Maxwell view. The magnification optical system and a Maxwellian view optical system will be respectively described below with reference to FIGS. 3 and 4.

Figure 3:
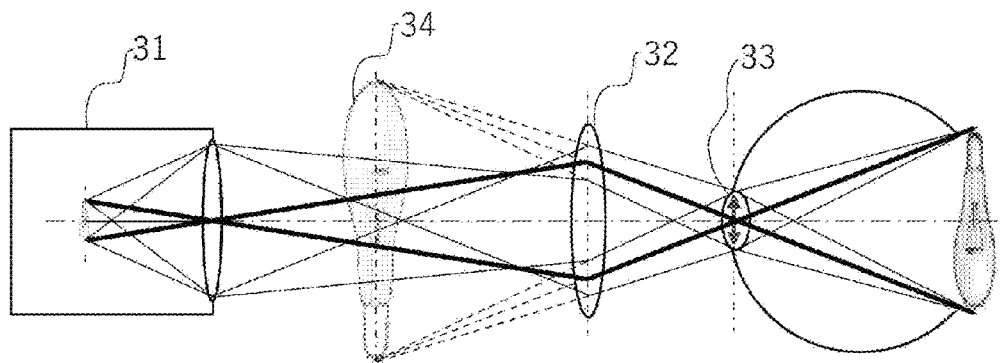
FIG. 3 is a diagram illustrating a magnification optical system.

As illustrated in FIG. 3, in the magnification optical system, the image display light projected from an image projection apparatus 31 reaches a pupil 33 through a hologram lens 32 provided as an image display light diffraction optical element. A light velocity of the image display light passes through the entire pupil (pupillary orifice) 33 and is focused on a retina. Therefore, even in a case where the pupil 33 or the hologram lens 32 is displaced, a field of view is easily secured and a picture image hardly disappears. Furthermore, since a virtual image 34 that seems floating in space is focused at a fixed distance, a recognized image can be varied depending on visual acuity of a user. The projection optical system that projects the image display light by the magnification optical system can include: a light source unit such as an LED or the like; and an image display unit such as a liquid crystal or the like.

Figure 4:
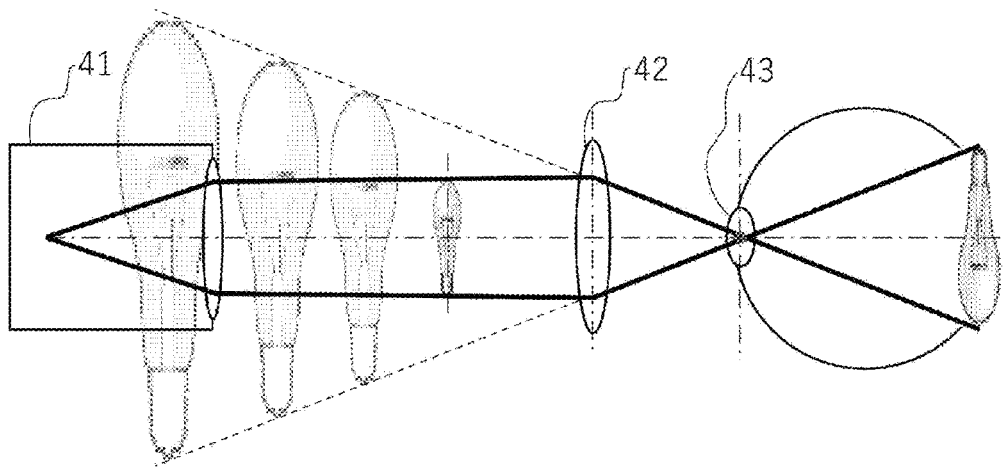
FIG. 4 is a diagram illustrating a Maxwellian view optical system.

As illustrated in FIG. 4, in the Maxwellian view optical system, image display light projected from an image projection apparatus 41 reaches a pupil 43 through a hologram lens 42 provided as an image display light diffraction optical element. The image display light is condensed in the vicinity of a pupillary orifice, and then a retina is irradiated with the image display light. In the Maxwellian view optical system, one dot (minimum unit of display) in a currently-displayed image passes through one point on a crystalline lens, and therefore, a one-dot picture on the retina is hardly affected by a state of the crystalline lens. For example, even a user having myopia, hyperopia, astigmatism, or the like can clearly recognize an image. Furthermore, a virtual image that seems floating in space is focus-free, and the virtual image can be focused regardless of a distance from the eye. In the Maxwellian view optical system, the image display light may be condensed in the vicinity of a pupillary orifice, for example, may be condensed on the pupillary orifice, or may be displaced in an optical axis direction from the pupillary orifice by several mm to several tens mm (e.g., 1 mm to 20 mm, particularly, 2 mm to 15 mm). Even when a focal point is not on the pupillary orifice like the latter case, the Maxwellian view can be achieved. Even when an image is displaced by displacing the focal point in the optical axis direction, a user hardly loses the image. The projection optical system that projects the image display light by the Maxwellian view optical system can include, for example, a light source unit that outputs laser light and a light scanning unit that performs two-dimensional scanning with the output laser light. The laser light can be output as one light flux including red, green, and blue laser light, for example. The light scanning unit may include a MEMS mirror, for example. The light scanning unit can move a direction of the laser light at a high speed so as to form an image on the retina.

The image display light adjustment unit 114 adjusts the image display light on the basis of the three-dimensional positional information acquired by the positional information acquisition unit 111. With this adjustment, the image display light projected to each of the two eyes is made suitable for presenting a desired image to a user. For example, the image display light adjustment unit 114 can adjust any one or more of a wavelength, intensity, and the direction of the image display light. The image display light adjustment unit 114 can adjust the image display light such that, for example, an image is shifted or rotated, or a size or distortion of an image is adjusted. Preferably, the image display light adjustment unit 114 can adjust the image display light on the basis of binocular parallax.

According to a preferred aspect of the present technology, the image display light adjustment unit 114 can adjust the image display light such that different rays of the image display light are projected to the two eyes, respectively. For example, the image display light adjustment unit 114 adjusts the image display light on the basis of parallax between the two eyes, thereby projecting the different rays of the image display light to the two eyes, respectively. Since the different rays of the image display light are projected to the two eyes, respectively, for example, a user recognizes a three-dimensional position of a presented image by binocular vision, for example. For example, an image seems floating in external scenery which the user currently sees through eyeglasses.

As illustrated in FIG. 2, the image display light diffraction optical element 150 is separated from the image projection apparatus 110 and arranged in front of each of the two eyes. The image display light diffraction optical element 150 is used to diffract the image display light projected from the image projection apparatus 110 and make the image display light reach each of the two eyes. According to the one aspect of the present technology, the image projection apparatus 110 may be located lower than a line-of-sight direction of a user as illustrated in FIG. 2, or the image projection apparatus 110 may be located higher than the line-of-sight direction of the user. An advancing direction of the image display light projected from the image projection apparatus 110 is changed by the image display light diffraction optical element 150 and guided to each of the two eyes of the user. With this configuration, the user can recognize an image by the image display light from the image projection apparatus 110 in a state in which there is no image projection apparatus 110 in the line-of-sight direction of the user. According to another aspect of the present technology, the image projection apparatus 110 may be located in the vicinity of a height same as the line-of-sight direction of the user. In this case, an overlapping portion between the image projection apparatus and the external scenery can be made to a level ignorable by the user by, for example, adjusting brightness of an image and/or limiting, for example, an image display position to a part (such as an upper half, a lower half, a left half, a right half, or the like) in the field of view. The image display light diffraction optical element 150 refracts the image display light in FIG. 2, but in the present technology, the image display light may reach the two eyes without being refracted by the image display light diffraction optical element 150.

Preferably, the image display light diffraction optical element 150 can have optical characteristics of: functioning as a lens for light having a wavelength range of the image display light; and transmitting light having a wavelength out of the wavelength range. Due to these optical characteristics, for example, a user can recognize scenery ahead in a line-of-sight direction through the image display light diffraction optical element 150, and also can recognize an image by the image display light. Examples of the image display light diffraction optical element 150 having the above-described optical characteristics include, for example, a hologram lens, preferably, a film-shaped hologram lens, and more preferably, a transparent film-shaped hologram lens. Desired optical characteristics can be provided to the hologram lens by using known techniques in this technical field. A commercially-available hologram lens may be used as the hologram lens, or the hologram lens may be manufactured by a known technique in this technical field.

Figure 5:
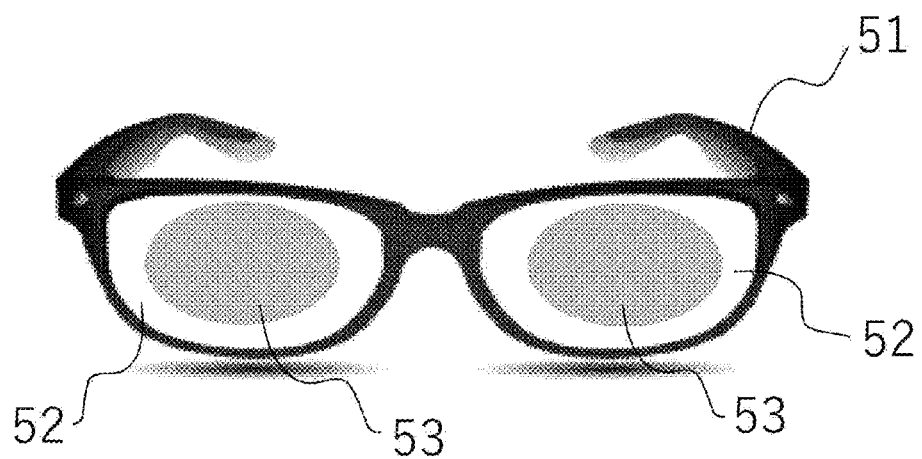
FIG. 5 is a view illustrating an exemplary image display light diffraction optical element according to the present technology and an exemplary tool adapted to hold the optical element in front of each of two eyes.

The image display light diffraction optical element 150 may be provided in a tool 151 adapted to hold the optical elements 150 in front of the two eyes. That is, the optical elements 150 can be held in front of the two eyes by the tool 151. The tool can include, for example, eyeglasses, goggles, or a helmet. For example, as illustrated in FIG. 5, a hologram lens 53 can be laminated as an image display light diffraction optical element on one side surface (a surface on the external scenery side or a surface on an eyeball side) of each of lenses 52 of eyeglasses 51. Furthermore, since the image display light diffraction optical element has the above-described optical characteristics, in a case where image projection is not performed, the tool 151 can be utilized for an original use of the tool (for example, the use as eyeglasses). The image projection system according to the present technology can be utilized by pasting the image display light diffraction optical elements 150 to a tool appropriately selected by a user or a person skilled in the art. Therefore, a range of choice of the tool that can be adopted in the present technology is extremely wide.

Preferably, the tool 151 includes no projection optical system. More preferably, the tool 151 may not necessarily include elements required to project the image display light (for example, the projection optical system, the power source, the apparatus driven by electric power, and the like). Since the tool 151 is thus configured, a size and weight of the tool 151 can be reduced.

As described above for the picture image processing unit 116, a mark used for the picture image processing unit 116 to acquire three-dimensional positional information may be provided in a part or in the periphery of each image display light diffraction optical element 150. The number of marks may be, for example, one, two, three, four, or more. With use of a plurality of marks, more accurate three-dimensional positional information can be acquired. A position of a mark can be selected so as to be unnoticeable. With this configuration, design of the head-mounted portion can be improved.

Figure 6:
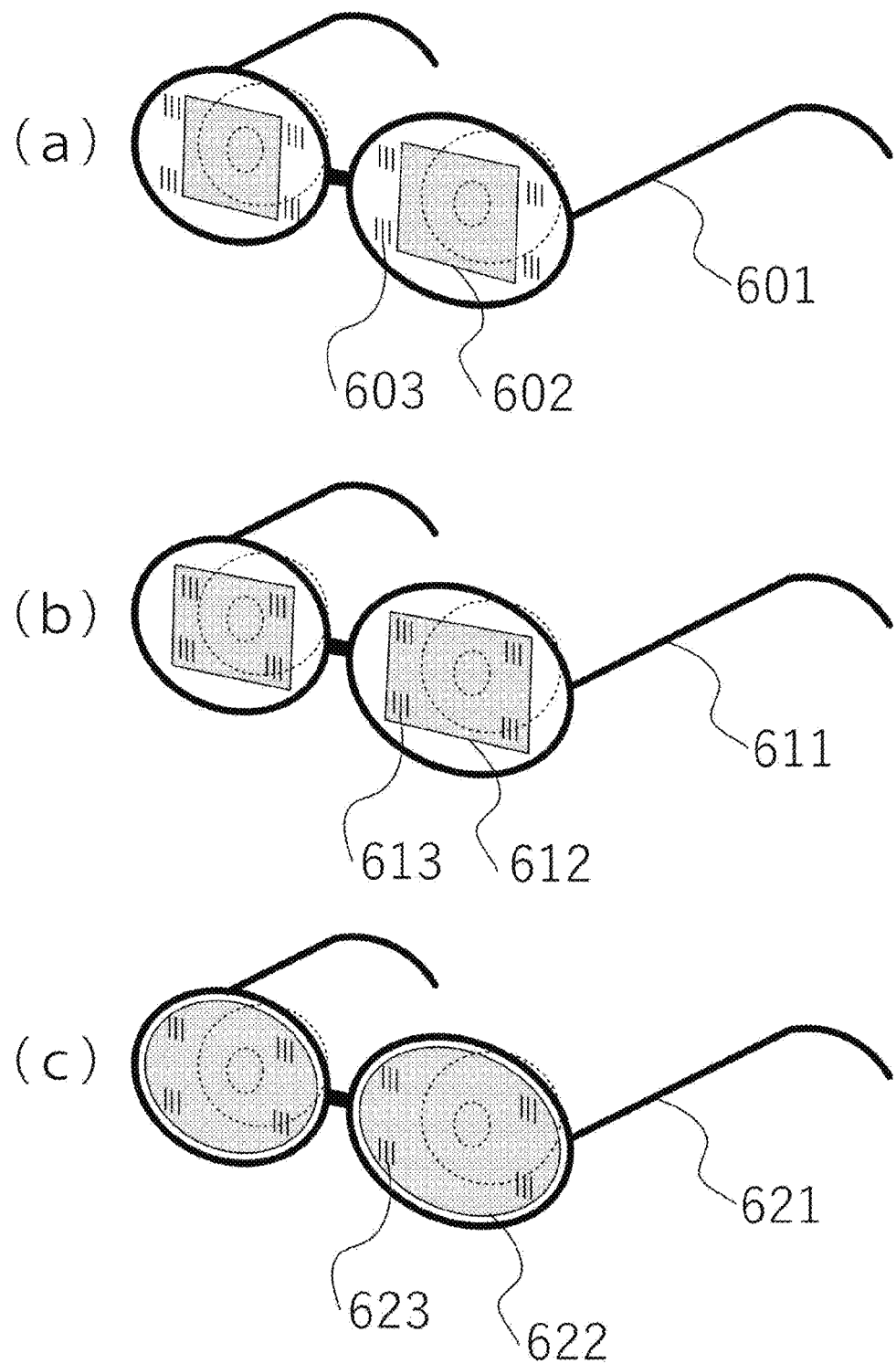
FIG. 6 provides views illustrating exemplary shapes of an image display light diffraction optical element and examples of arrangement of marks according to the present technology.

FIG. 6 illustrates exemplary shapes of an optical image display light diffraction optical element and examples of arrangement of marks.

As illustrated in FIG. 6(*a*), a hologram film lens 602 is pasted to a part of each of lens surfaces of eyeglasses 601. Four marks 603 are provided in a periphery of the hologram film lens 602. When the picture image processing unit 116 recognizes these marks 603, three-dimensional positional information of the hologram film lens 602 that is an image display light diffraction optical element is acquired. A mark 603 may be formed by using, for example, a hologram, a reflection film, or an infrared light reflection film, or may include a predetermined pattern or the like. In a case where a mark 603 is an infrared reflective film, the positional information acquisition unit may include an infrared light projection device and an infrared light detection device.

As illustrated in FIG. 6(*b*), a hologram film lens 612 may be pasted to a part of each of lens surfaces of eyeglasses 611. In FIG. 6(*b*), marks 613 are provided at four corners in the hologram film lens 612.

As illustrated in FIG. 6(*c*), a hologram lens 622 may be pasted to an entire surface of each of lens surfaces of eyeglasses 621. In this case, four marks 623 are provided in the hologram lens 622.

Figure 7:
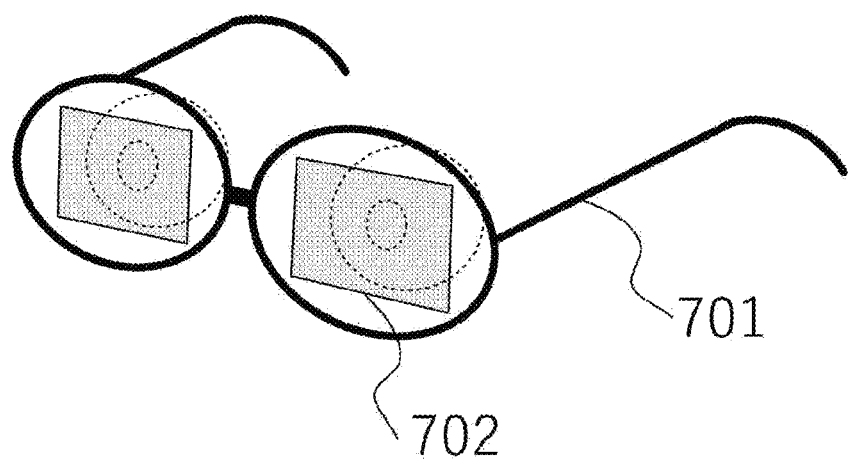
FIG. 7 is a view illustrating an exemplary image display light diffraction optical element according to the present technology.

As described above for the picture image processing unit 116, the three-dimensional positional information of the image display light diffraction optical elements and/or the three-dimensional positional information of the two eyes may be acquired by three-dimensionally measuring and/or learning the image display light diffraction optical elements and/or the two eyes. In this case, the above-described mark is not necessary. Therefore, as illustrated in FIG. 7, for example, eyeglasses 701 to which only hologram lenses 702 as image display light diffraction optical elements are pasted can constitute the system of the present technology.

Figure 8:
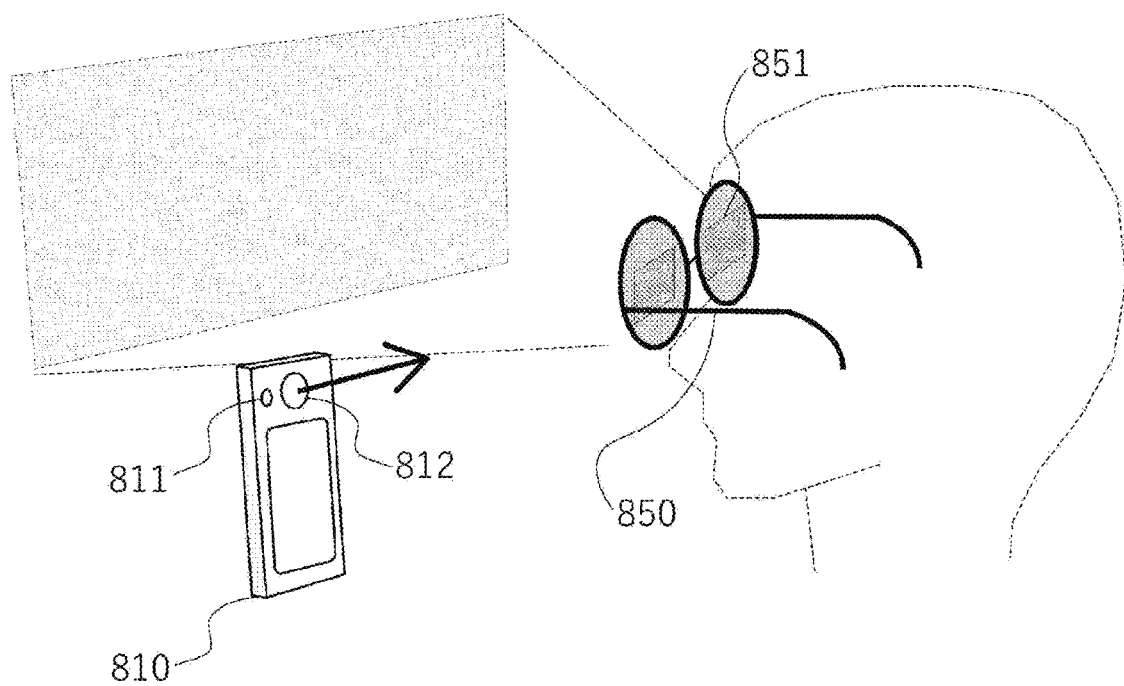
FIG. 8 is a view illustrating an exemplary state in which a user utilizes the image projection system according to the present technology.

The image projection apparatus 110 may include a portable apparatus such as a smartphone, a mobile phone, a watch-type terminal, or the like. Since such a portable apparatus is adopted as the image projection apparatus in the image projection system of the present technology, image projection according to the present technology can be performed by a small or ultra-small mobile apparatus. FIG. 8 illustrates an exemplary state in which a user utilizes the image projection system according to the present technology including an image projection apparatus that is a smartphone. Eyeglasses 850 are mounted on a head of the user, and an image display light diffraction optical element 851 is pasted to each of lenses of the eyeglasses 850. Furthermore, the user carries a smartphone 810 in a hand, for example.

An image sensor (camera) 811 is provided in the smartphone 810. Three-dimensional positional information of the image display light diffraction optical elements 851 located in front of two eyes of the user is acquired by the image sensor 811, and three-dimensional positional information of the two eyes is also acquired as necessary. The positional information acquisition unit in the smartphone 810 adjusts image display light on the basis of the three-dimensional positional information. The adjusted image display light is projected from a projection port 812 of the smartphone 810 toward the image display light diffraction optical elements 851. The image display light is diffracted by each of the image display light diffraction optical elements 851 and reaches the two eyes of the user. Consequently, the user recognizes an image superimposed on external scenery.

Furthermore, each image display light diffraction optical element 851 can have optical characteristics of: functioning as a lens for light having a wavelength range of the image display light; and transmitting light having a wavelength out of the wavelength range. With this configuration, the image formed by the image display light is superimposed on the external scenery.

(3) Second Example of First Embodiment
(Exemplary Way of Projecting Image Display Light)

According to the one aspect of the present technology, the image display light adjustment unit adjusts image display light such that the image display light is projected to eyeballs (or pupillary orifices) of a right eye and a left eye out of the image projectable region and the image display light is not projected to a periphery thereof. With this configuration, the image display light is projected only to a region included in the image projectable region and necessary for a user to recognize an image. A way of projecting the image display light in this aspect will be described below with reference to FIGS. 9 and 10.

Figure 9:
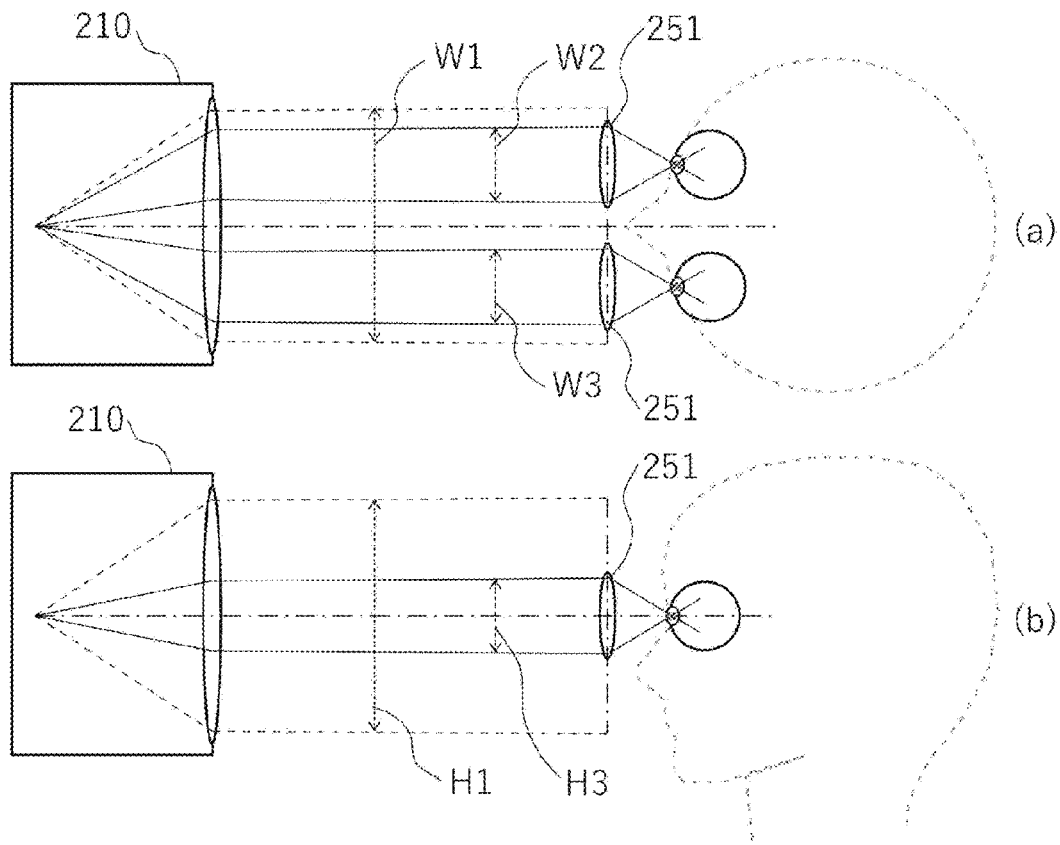
FIG. 9 is a schematic diagram illustrating an exemplary state in which image display light is projected to a user in accordance with the present technology.
Figure 10:
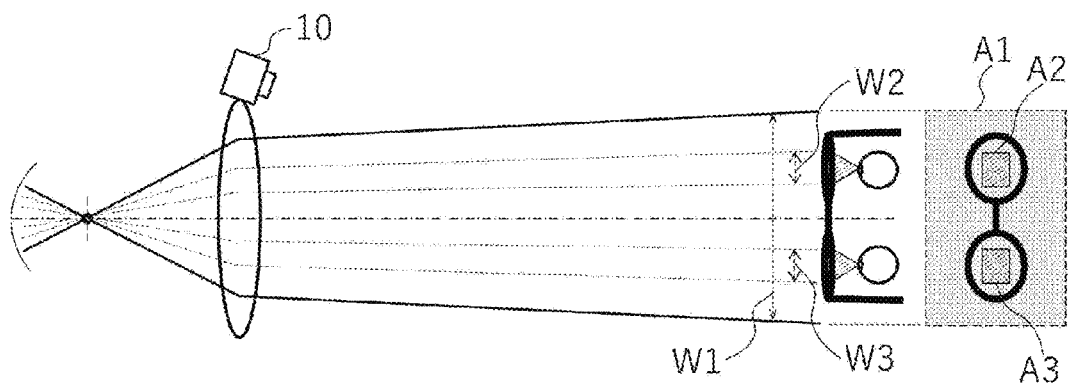
FIG. 10 is a schematic diagram illustrating an exemplary state in which image display light is projected in accordance with the present technology.

FIGS. 9 and 10 are schematic diagrams each illustrating an exemplary state in which the optical image display light is projected in accordance with the present aspect. In FIGS. 9 and 10, the image display light is projected to a user by the Maxwellian view optical system.

FIG. 9(*a*) is a schematic diagram in a case of viewing, from above a head of the user, a state in which the image display light is projected to the user from the image projection apparatus. A width in a horizontal direction of an image projectable region of a projection optical system of an image projection apparatus 210 is indicated as W1. A width of the image display light required to present an image to a right eye is defined as W2, and a width of the image display light required to present an image to a left eye is defined as W3.

Therefore, the image display light is projected to regions of W2 and W3 out of the width W1 of the image projectable region, and the image display light is not projected to a region in a periphery thereof.

FIG. 9(*b*) is a schematic diagram in a case of viewing, from a lateral direction of the user, a state in which the image display light is projected to the user from the image projection apparatus. A vertical width (height) of the image projectable region of the projection optical system of the image projection apparatus 210 is indicated as H1. A width of the image display light required to present an image to the left eye is indicated as H3. Therefore, the image display light is projected to the region of H3 out of the width H1 of the image projectable region, and the image display light is not projected in a periphery thereof. As for the right eye, the image display light is similarly projected only to a necessary region out of H1.

The projected image display light is diffracted by each image display light diffraction optical element 251, condensed on a pupillary orifice, and reaches a retina. Consequently, the image is presented to the user by the Maxwellian view. Note that, in FIG. 9, refraction of an optical path by the image display light diffraction optical element 251 is omitted.

FIG. 10 illustrates: a schematic diagram in a case of viewing, from above a head of the user, the state in which the image display light is projected to the user from the image projection apparatus; and a schematic diagram of the image projectable region in a case of viewing the same state from front of a face of the user. As illustrated in FIG. 10, in a case of the view from above the head, the image display light is projected to the regions of W2 and W3 out of the width W1 of the image projectable region, and the image display light is not projected to the periphery thereof. Furthermore, in a case of the view from the front of the face of the user, the image display light is projected to regions of A2 and A3 in eyeglasses out of an image projectable region A1 covering two eyes, and the image display light is not projected to other regions. Since an image display light diffraction optical element is provided in each of the regions of A2 and A3, the image display light is projected to each of the two eyes of the user.

Furthermore, as illustrated in FIG. 10, positions of the image display light diffraction optical elements and positions of the two eyes can be acquired by an optical detection device 10 such as an image sensor or the like.

As described above with reference to FIGS. 9 and 10, in the present aspect, the image display light is projected only to the region that is included in the image projectable region and necessary to present an image to both the right eye and the left eye.

Figure 21:
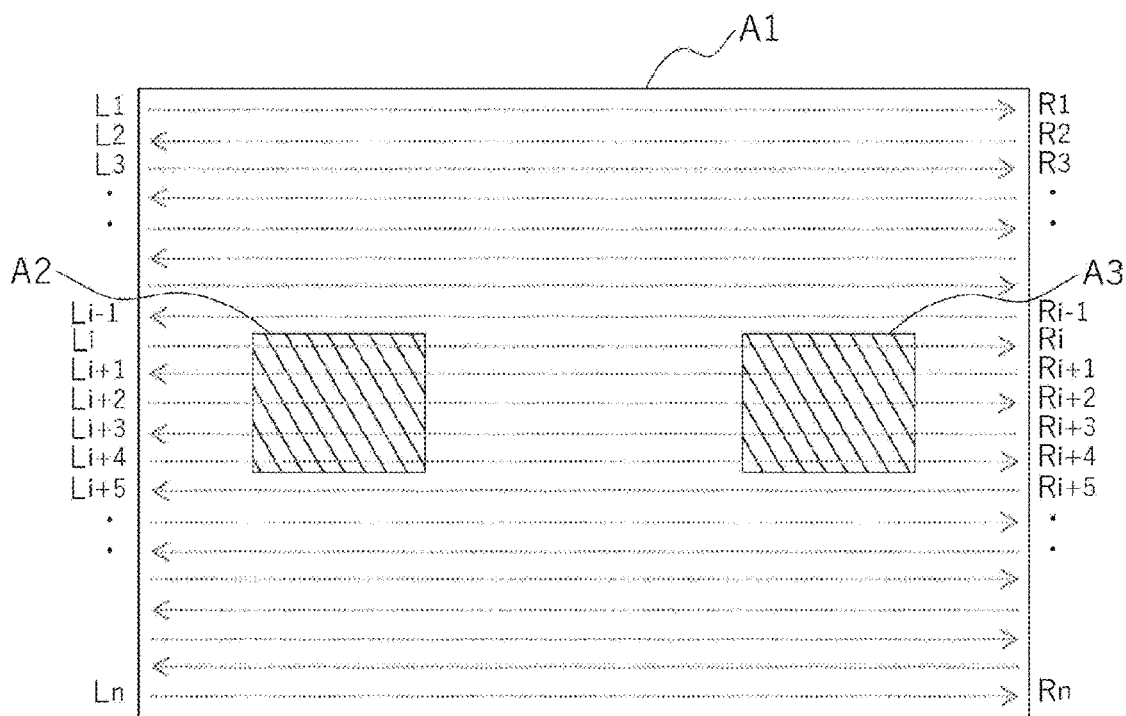
FIG. 21 is a diagram illustrating an exemplary way of scanning with image display light.

An exemplary case where the above-described projection of image display light is performed by scanning will be described with reference to FIG. 21. FIG. 21 is a diagram illustrating an exemplary way of scanning with image display light.

Assumed is a case where the image display light is projected to regions A2 and A3 out of an image projectable region A1 illustrated in FIG. 21, and the image display light is not projected to other regions. Scanning lines in the image projectable region A1 and scanned by a projection optical system include $L_1$ to $R_1$, $R_2$ to $L_2$, . . . , and $L_n$ to $R_n$. In the above-described case, the image display light is not projected to the scanning lines $L_1$ to $R_1$, $R_2$ to $L_2$, . . . , and $R_{i-1}$ to $L_{i-1}$. The image display light is projected to portions overlapping with A2 and A3 out of a scanning line $L_i$ to $R_i$, and the image display light is not projected to other portions out of the scanning line $L_i$ to $R_i$. The similar applies to scanning lines from a scanning line $L_{i+1}$ to $R_{i+1}$ to a scanning line $L_{i+4}$ to $R_{i+4}$. The image display light is not projected to scanning lines from a scanning line $L_{i+5}$ to $R_{i+5}$ to a scanning line $L_n$ to $R_n$. Thus, the image display light is projected to the regions A2 and A3 out of the image projectable region A1, and the image display light is not projected to other regions. In this manner, the image display light can be projected only to a specific region. Furthermore, the image display light can be controlled by the image display light adjustment unit in order to project the image display light only to the specific region.

Note that, in FIG. 21, an interval between the scanning lines is illustrated extremely wide for better understanding. Needless to mention, the scanning lines are set at narrower intervals in the actual image projection apparatus.

Furthermore, in the magnification optical system also, the image display light can be adjusted such that the image display light is projected to the regions A2 and A3 out of the image projectable region A1 and the image display light is not projected to other regions.

Note that the regions A2 and A3 are illustrated in rectangular shapes in FIG. 21 considering ease of understanding, but needless to mention, these may be set in any shape (for example, a shape of an eyeglass lens or the like)

In the image projectable region, a peripheral region of the region to which the image display light is projected can also be referred to as a margin region. Even when three-dimensional positions of the image display light diffraction optical elements are changed due to movement of a user, movement of eyeglasses, or the like, the image display light can be projected to the positions after the change because of this margin region. Furthermore, because of this margin region, there is no need to provide the image projection apparatus with a constituent element to control deflection of the image display light, and the configuration of the image projection apparatus can be more simplified. This can also reduce the size, the weight, or the cost of the image projection apparatus.

Furthermore, the three-dimensional positional information of image display light diffraction optical elements after such a change is acquired by the positional information acquisition unit. Then, the image display light adjustment unit adjusts the image display light on the basis of this three-dimensional positional information. Therefore, even when the three-dimensional positions of the image display light diffraction optical elements are changed due to movement of the user or the eyeglasses, as far as the optical elements exist in the image projectable region, the image display light can be projected toward the optical elements by the image display light adjustment unit adjusting the image display light.

Figure 11:
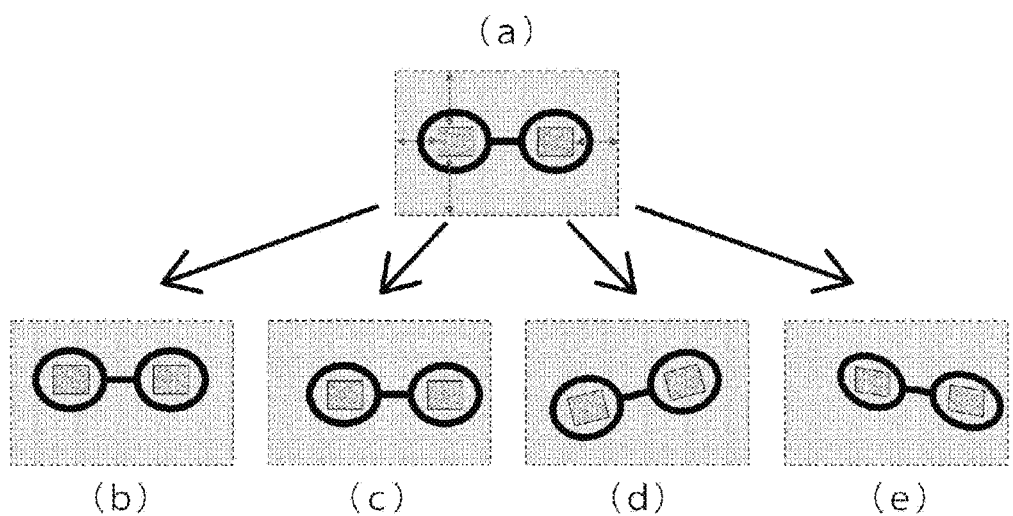
FIG. 11 is a diagram illustrating positional changes of the image display light diffraction optical elements in an image projectable region.

For example, as illustrated in FIG. 11(a), assume that standard positions of image display light diffraction optical elements are defined at a center portion of the image projectable region. Due to the above-described change, the positions of the image display light diffraction optical elements can be displaced in an upper-lower direction, for example, as illustrated in FIG. 11(b), displaced in a right-left direction as illustrated in FIG. 11(c), displaced in a rotational direction as illustrated in FIG. 11(d), or displaced in a tilted manner in upper-lower and right-left directions and further displaced in a rotational direction as illustrated in FIG. 11(e). Even in the event of such changes in the three-dimensional positions, appropriate image display light is projected to two eyes of a user by: the positional information acquisition unit acquiring the three-dimensional positions of the image display light diffraction optical elements; and the image display light adjustment unit adjusting the image display light such that the image display light is projected to the acquired three-dimensional positions after the changes.

In a case where image display light diffraction optical elements are located at the standard positions of the image projectable region, the margin region in the upper-lower direction includes a region that extends in the upper direction from an upper end, for example, by 4 to 7 cm, preferably, 5 to 6 cm, and extends in the lower direction from a lower end, for example, by 4 to 7 cm, preferably, 5 to 6 cm. Similarly, in a case where the image display light diffraction optical elements are located at the center of the image projectable region, the margin region in the right-left direction can include a region that extends in the left direction from a left end, for example, by 4 to 7 cm, preferably, 5 to 6 cm, and extends in the right direction from a right end, for example, by 4 to 7 cm, preferably, 5 to 6 cm.

Since a human face who concentrates on a picture image often shakes within a range of about 1 to 2 cm, changes in the three-dimensional positions of the image display light diffraction optical elements caused by such shaky movement of the human face can be recovered by the above-described margin region. Furthermore, for example, in a case where a user closely watches the front while holding the image projection apparatus (for example, a portable apparatus such as a smartphone or the like) in a hand, the image projection apparatus may be inclined by, for example, 7 to 8 degrees and/or the hand that holds the image projection apparatus sometimes shakes during use. In this case also, the inclination of the apparatus or the shaky movement of the hand causes relative changes in the three-dimensional positions of the image display light diffraction optical elements, and such relative changes can be recovered by the above-described margin region.

In the above-described projecting way, the image display light is projected to the two eyes by adjusting the region to which the image display light is projected in the image projectable region. Therefore, an optical path of the image display light is not required to be deflected. Accordingly, in a case of adopting this projecting way, the projection optical system is not required to include a deflection control unit that deflects the optical path.

(4) Third Example of First Embodiment (Exemplary Way of Projecting Image Display Light)

According to the one aspect of the present technology, the projection optical system divides, into two, a region to which image display light can be projected (image projectable region), and the two regions cover right and left eyes, respectively. With this configuration, a ratio of an image viewable region to the image projectable region is increased. Therefore, resolution (resolving power) of an image is more easily increased. The ratio of the image viewable region to the image projectable region can be selected considering the required margin region and required resolution. Whether or not to divide the image projectable region may be selected in accordance with the selected ratio.

To divide the image projectable region into two, for example, a wedge plate, a dogleg shape mirror, or a diffraction element may be provided in front of a projection lens of the image projection apparatus. Preferably, the diffraction element can be a volume hologram. The volume hologram can be a transmissive type or a reflective type. In the present technology, an optical system constituent element to divide the image projectable region into two may be appropriately selected by a person skilled in the art. Therefore, a degree of freedom in designing the image projection apparatus according to the present technology is increased.

Hereinafter, a configuration to divide the image projectable region into two will be described with reference to FIGS. 12 to 15.

Figure 12:
FIG. 12 is a diagram illustrating an exemplary configuration to divide the image projectable region into two in accordance with the present technology.

In a projection optical system illustrated in FIG. 12, a transmissive-type wedge plate 302 is provided in front of a projection lens 301. With this configuration, the image projectable region is divided into two regions (a region covering a right eye and a region covering a left eye).

Figure 13:
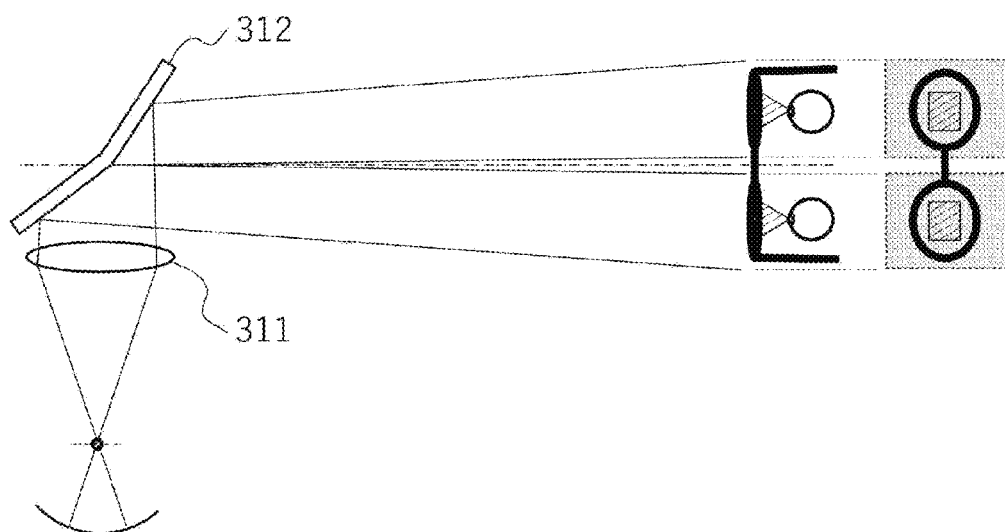
FIG. 13 is a diagram illustrating an exemplary configuration to divide the image projectable region into two in accordance with the present technology.

In a projection optical system illustrated in FIG. 13, a dogleg shape mirror 312 is provided in front of a projection lens 311. With this configuration, the image projectable region may be divided into two regions. In this case, the division is performed by reflecting, at the dogleg shape mirror 312, the image display light that has passed through the projection lens 311.

Figure 14:
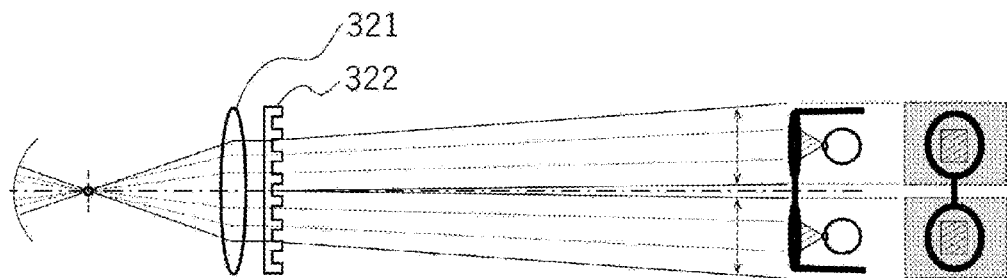
FIG. 14 is a diagram illustrating an exemplary configuration to divide the image projectable region into two in accordance with the present technology.

In a projection optical system illustrated in FIG. 14, a transmissive-type volume hologram element 322 is provided in front of a projection lens 321. With this configuration, the image projectable region can be divided into two regions.

Figure 15:
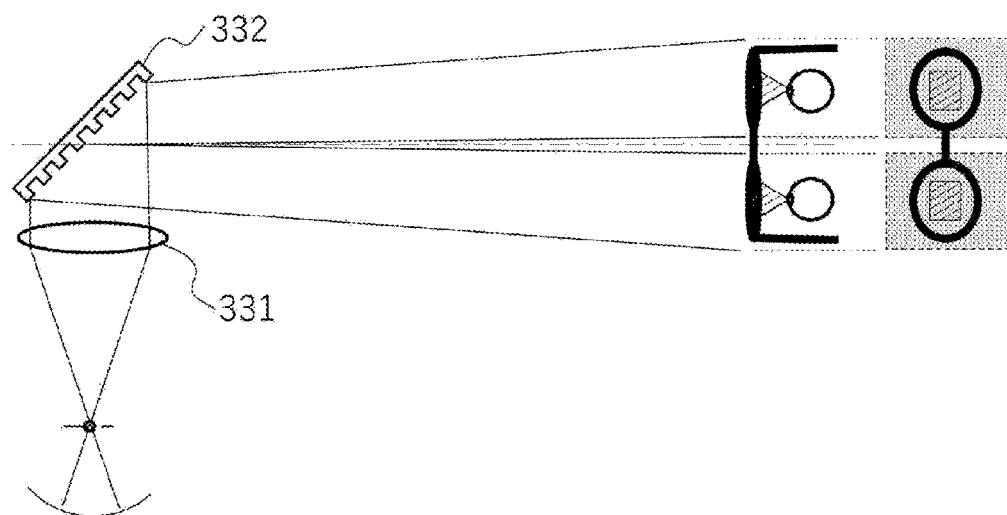
FIG. 15 is a diagram illustrating an exemplary configuration to divide the image projectable region into two in accordance with the present technology.

In a projection optical system illustrated in FIG. 15, a reflective-type volume hologram element 332 is provided in front of a projection lens 331. With this configuration, the image projectable region may be divided into two regions. In this case, the division is performed by reflecting, at the reflective-type volume hologram element 332, the image display light that has passed through the projection lens 331.

Changes in three-dimensional positions of image display light diffraction optical elements in the image projectable regions in the case of the present aspect described with reference to FIGS. 12 to 15 above will be described with reference to FIG. 16.

Figure 16:
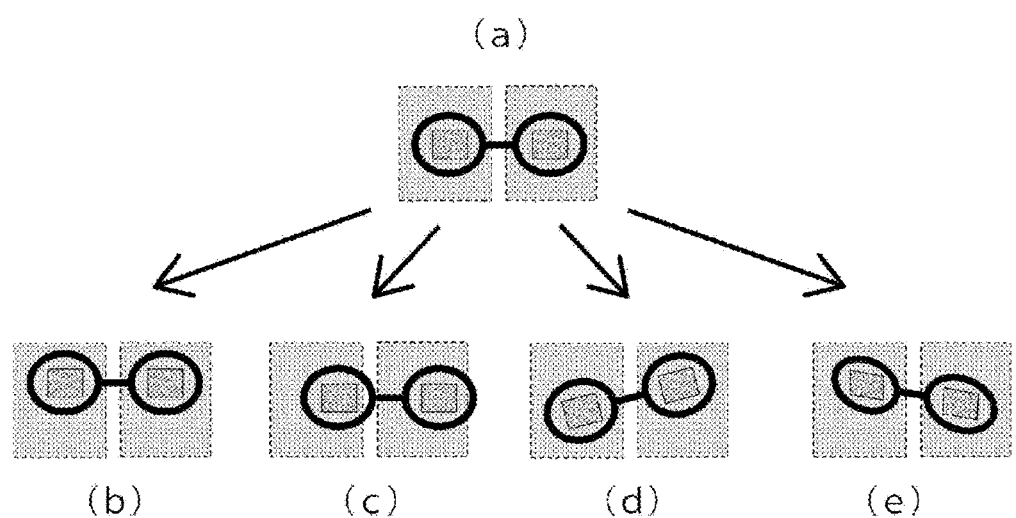
FIG. 16 is a diagram illustrating positional changes of the image display light diffraction optical elements inside the image projectable region.

FIG. 16 illustrates image projectable regions and regions to which the image display light is projected in the image projectable regions in a case of a view from front of a user.

As illustrated in FIG. 16(a), assume that standard positions of image display light diffraction elements are defined at center portions of the image projectable regions covering a right eye and a left eye, respectively. The positions of the image display light diffraction elements can be displaced in an upper-lower direction, for example, as illustrated in FIG. 16(b), displaced in a right-left direction as illustrated in FIG. 16(c), displaced in a rotational direction as illustrated in FIG. 16(d), or displaced in a tilted manner in upper-lower and right-left directions and further displaced in a rotational direction as illustrated in FIG. 16(e). Even in the event of such changes in the three-dimensional positions, the image display light adjustment unit adjusts the image display light such that the three-dimensional positions of the image display light diffraction optical elements can be accurately acquired by the positional information acquisition unit and then appropriate image display light is projected to the acquired three-dimensional positions after the changes.

Furthermore, compared to the case where the image projectable region is not divided as described in the second example, a ratio of a region to which the image display light is projected in the image projectable region can be more increased by more narrowing the image projectable region in the present aspect. Therefore, the resolution can be more increased in the present aspect, compared to the case where the image projectable region is not divided.

In the above-described projecting way, the image display light is projected to the two eyes by adjusting the region to which the image display light is projected in the image projectable region. Therefore, an optical path of the image display light is not required to be deflected. Accordingly, in a case of adopting this projecting way, the projection optical system is not required to include a deflection control unit that deflects the optical path.

(5) Fourth Example of First Embodiment (Exemplary Way of Projecting Image Display Light)

According to the one aspect of the present technology, the projection optical system has a configuration such that a region to which image display light can be projected (image projectable region) is divided into two, the two regions cover right and left eyes, respectively, and a deflection control unit that controls deflection of the image display light can be included. With this configuration, the image display light is projected only to a region included in the image projectable region and necessary for a user to recognize an image. Additionally, the deflection control unit can deflect the image display light such that the image display light is projected into the two divided image projectable regions. Therefore, compared to the case described in the third example, each image projectable region can be more narrowed in the present aspect. With this configuration, the ratio of the region of the image projectable region to which the image display light is projected can be more increased. Therefore, the resolution can be more increased in the present aspect, compared to the case of the third example described above.

The deflection control unit can include a movable mirror such as a galvanometer mirror or the like. The movable mirror may be able to deflect the image display light, for example, in each of an X-axis direction and a Y-axis direction. For example, two galvanometer mirrors can perform deflection in the X-axis direction and deflection in the Y-axis direction, respectively. With such deflection, the image display light can be adjusted so as to be projected to an appropriate position (for example, inside a pupillary orifice) in each of the two eyes.

To divide the image projectable region into two, for example, a wedge plate, a dogleg shape mirror, or a diffraction element may be provided in front of a projection lens of the image projection apparatus. Preferably, the diffraction element can be a volume hologram. The volume hologram can be a transmissive type or a reflective type.

Hereinafter, an exemplary configuration in the present aspect will be described with reference to FIG. 17.

Figure 17:
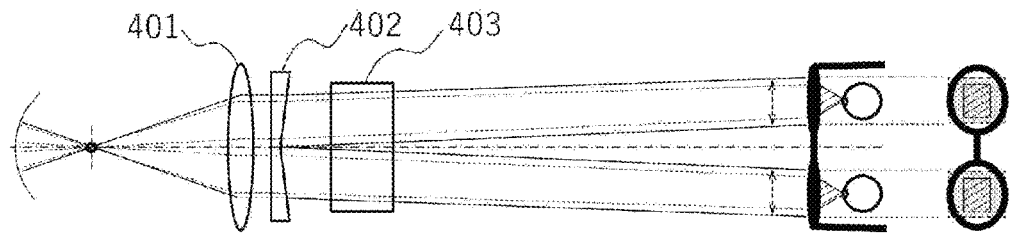
FIG. 17 is a diagram illustrating an exemplary configuration to divide the image projectable region into two in accordance with the present technology.

In a projection optical system illustrated in FIG. 17, a transmissive-type wedge plate 402 is provided in front of a projection lens 401. A deflection control unit 403 is further provided in front of the wedge plate. The wedge plate 402 divides the image projectable region into two regions (a region covering a right eye and a region covering a left eye). Furthermore, the image display light is deflected by the deflection control unit 403.

Figure 18:
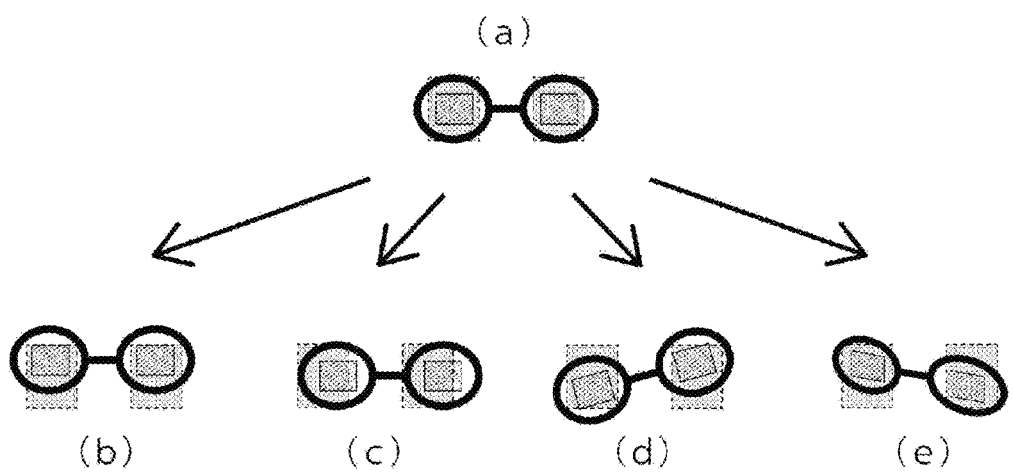
FIG. 18 is a diagram illustrating positional changes of the image display light diffraction optical elements inside the image projectable region.

FIG. 18 illustrates image projectable regions and regions to which the image display light is projected in the image projectable regions in the case of the view from front of a user.

As illustrated in FIG. 18(*a*), assume that standard positions of image display light diffraction elements are defined at center portions of the image projectable regions covering a right eye and a left eye, respectively. The positions of the image display light diffraction elements can be displaced in an upper-lower direction, for example, as illustrated in FIG. 18(*b*), displaced in a right-left direction as illustrated in FIG. 18(*c*), displaced in a rotational direction as illustrated in FIG. 18(*d*), or displaced in a tilted manner in upper-lower and right-left directions and further displaced in a rotational direction as illustrated in FIG. 18(*e*). Even in the event of such changes in three-dimensional positions, the image display light adjustment unit adjusts the image display light such that the three-dimensional positions of the image display light diffraction optical elements can be accurately acquired by the positional information acquisition unit and then appropriate image display light is projected to the acquired three-dimensional positions after the changes. In the case of FIG. 18(*c*), the three-dimensional positions of the image display light diffraction elements are changed to the outside of the image projectable regions. In this case, the image display light is deflected by the deflection control unit such that the image display light is projected to the three-dimensional positions after the changes.

(6) Fifth Example of First Embodiment (Exemplary Configuration of Image Projection Apparatus)

Figure 19:
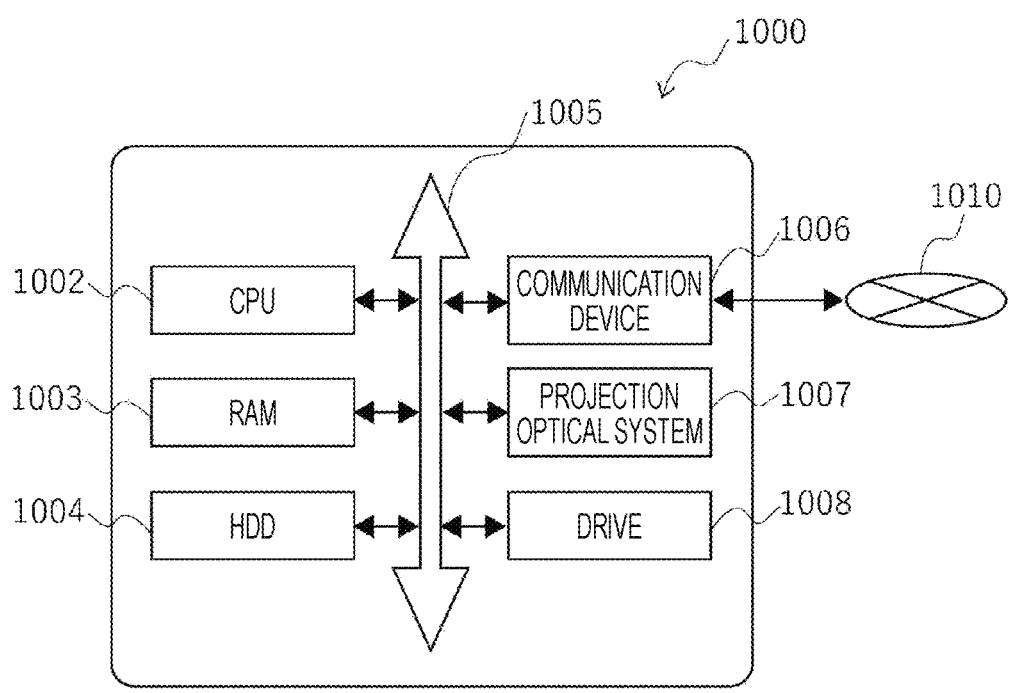
FIG. 19 is a diagram illustrating an exemplary configuration of the image projection apparatus according to the present technology.

Hereinafter, an exemplary configuration of the image projection apparatus constituting the image projection system of the present technology will be described with reference to FIG. 19. FIG. 19 is a diagram illustrating a schematic exemplary configuration of the image projection apparatus according to the present technology.

An image projection apparatus 1000 illustrated in FIG. 19 includes a central processing unit (CPU) 1002 and a RAM 1003. The CPU 1002 and the RAM 1003 are connected to each other via a bus 1005, and are further connected to other constituent elements of the image projection apparatus 1000 via the bus 1005.

The CPU 1002 performs control and arithmetic operation for the image projection apparatus 1000. An arbitrary processor can be used as the CPU 1002, and examples thereof can include a processor of a Xeon (registered trademark) series, a Core (trademark) series, or an Atom (trademark) series. The functions of the control unit 113, the image display light adjustment unit 114, and the picture image processing unit 116 of the image projection apparatus 110 described with reference to FIG. 1 can be implemented by the CPU 1002, for example.

The RAM 1003 includes, for example, a cache memory and a main memory, and can temporarily store a program or the like used by the CPU 1002.

The image projection apparatus 1000 may include a disk 1004, a communication device 1006, a projection optical system 1007, and a drive 1008. All of these constituent elements can be connected to the bus 1005.

The disk 1004 can store an operating system (for example, WINDOWS (registered trademark), UNIX (registered trademark), LINUX (registered trademark), or the like), a program to implement the image projection method according to the present technology, a program to perform positional information acquisition processing, a program to adjust the image display light, other various kinds of programs, and various kinds of data (e.g., image data).

The communication device 1006 connects the image projection apparatus 1000 to a network 1010 by a wire or wirelessly. The communication device 1006 can acquire the image projection apparatus 1000, various kinds of data (e.g., image data or the like) via the network 1010. The acquired data can be stored in the disk 1004, for example. A type of the communication device 1006 may be appropriately selected by a person skilled in the art. The disk 1004 may be, for example, a semiconductor recording medium such as a flash memory or the like, and is not particularly limited.

The projection optical system 1007 can project, toward an image display light diffraction element, image display light controlled in accordance with the present technology.

The drive 1008 can read the information recorded in the recording medium and output the information to the RAM 1003. The recording medium is, for example, a microSD memory card, an SD memory card, or a flash memory, but not limited thereto.

2. Second Embodiment (Image Projection Apparatus)

The present technology also provides an image projection apparatus constituting an image projection system according to the present technology. The image projection apparatus according to the present technology is an image projection apparatus described above in "1. First Embodiment (Image Projection System)", and all of the matters described for the image projection apparatus apply to the image projection apparatus in the present embodiment. Therefore, a description of the apparatus will be omitted.

The image projection apparatus is used in combination with an image display light diffraction optical element described above in "1. First Embodiment (Image Projection System)", thereby exerting effects as described above.

3. Third Embodiment (Image Display Light Diffraction Optical Element)

The present technology also provides an image display light diffraction optical element constituting an image projection system according to the present technology. The image display light diffraction optical element is used to diffract image display light projected from an image projection apparatus according to the present technology and make the image display light reach each of two eyes, and furthermore, the image display light diffraction optical element is separated from the image projection apparatus and arranged in front of each of the two eyes.

The image display light diffraction optical element is an image display light diffraction optical element described above in "1. First Embodiment (Image Projection System)", and all of the matters described for the image display light diffraction optical element apply to the image display light diffraction optical element in the present embodiment. Therefore, a description of the optical element will be omitted.

The optical element is used in combination with an image projection apparatus described above in "1. First Embodiment (Image Projection System)", thereby exerting effects as described above.

4. Fourth Embodiment (Tool Including Image Display Light Diffraction Optical Element)

The present technology also provides a tool (e.g., eyeglasses, goggles, a helmet, or the like) including image display light diffraction optical elements constituting an image projection system according to the present technology. The tool is separated from the image projection apparatus and adapted to hold the optical element in front of two eyes.

The tool and the image display light diffraction optical elements included in the tool are a tool and image display light diffraction optical elements described above in "1. First Embodiment (Image Projection System)", and all of the matters described for the tool and the image display light diffraction optical elements apply to the tool and the image display light diffraction optical elements in the present embodiment. Therefore, the description of the tool and the optical elements will be omitted.

The tool is used in combination with an image projection apparatus described above in "1. First Embodiment (Image Projection System)", thereby exerting effects as described above.

5. Fifth Embodiment (Image Projection Method)

(1) Description of Fifth Embodiment

The present technology provides an image projection method including: a positional information acquisition process of acquiring three-dimensional positional information of an image display light diffraction optical element provided in front of each of two eyes; an image display light adjustment process of adjusting projected image display light on the basis of the three-dimensional positional information acquired in the positional information acquisition process; and a projection process of projecting the image display light from one projection optical system toward the image display light diffraction optical elements within a region covering the two eyes, the image display light having been adjusted in the image display light adjustment process, in which the image display light diffraction optical elements are separated from the image projection apparatus and arranged in front of the two eyes, respectively.

Effects described above in "1. First Embodiment (Image Projection System)" are exerted by the image projection method according to the present technology.

(2) Example of Fifth Embodiment (Image Projection Method)

Figure 20:
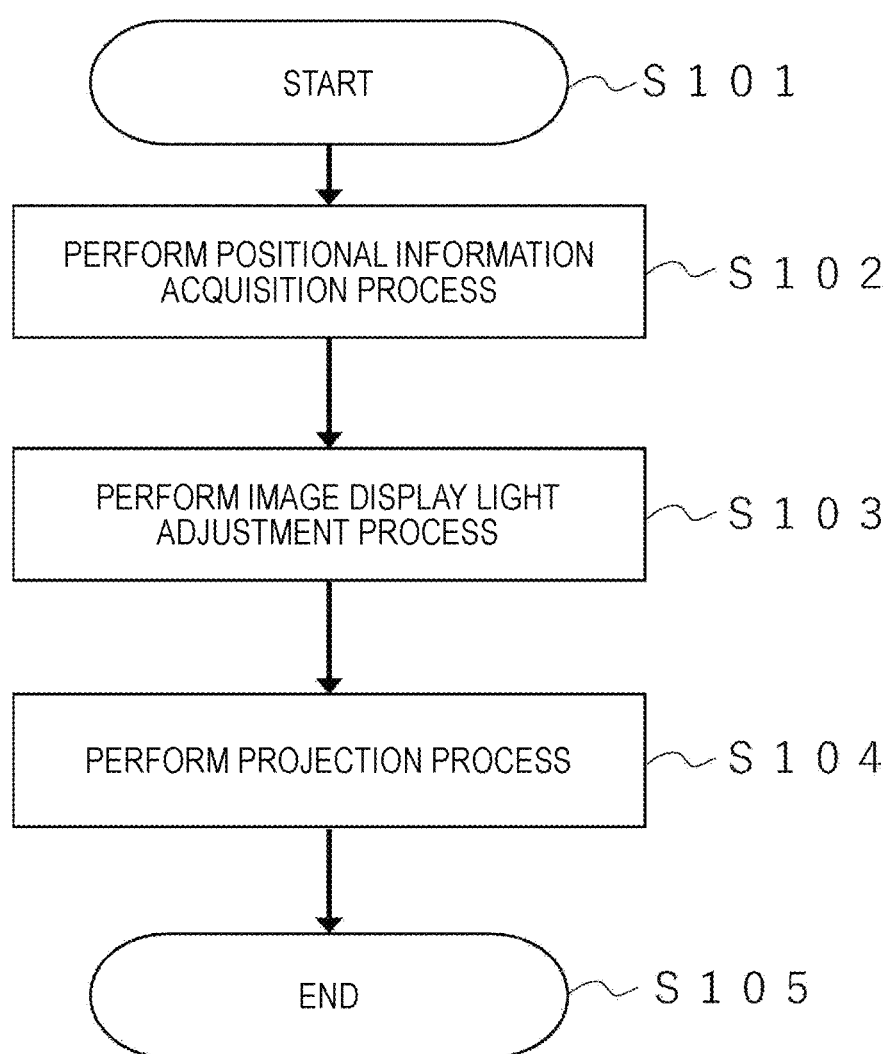
FIG. 20 is a diagram illustrating an exemplary flow of an image projection method according to the present technology.

Hereinafter, an example of the image projection method according to the present technology will be described with reference to FIGS. 1, 2, and 20. FIG. 20 is a diagram illustrating an exemplary flow of the image projection method according to the present technology.

In step S101, the image projection apparatus 110 starts image projection processing according to the present technology.

In the positional information acquisition process in step S102, the positional information acquisition unit 111 acquires three-dimensional positional information of an image display light diffraction optical element 150. The positional information acquisition process can include, for example: a picture image acquisition process in which a control unit 113 drives an optical detection device 115 to acquire a picture image of the image display light diffraction optical element 150 provided in front of each of two eyes; an information processing process in which a picture image processing unit 116 acquires, from the picture image, three-dimensional positional information of the image display light diffraction optical element 150. In the positional information acquisition process in step S102, the three-dimensional positional information of the two eyes may also be acquired.

In the image display light adjustment process in step S103, an image display light adjustment unit 114 adjusts the image display light on the basis of the three-dimensional positional information acquired in step S102.

In the projection process of step S104, one projection optical system 112 projects, toward the image display light diffraction optical element 150, the image display light adjusted in the image display light adjustment process. The projected image display light is diffracted by the image display light diffraction optical element 150, reaches each of the two eyes of a user, and the user recognizes an image.

Note that step S102, step S103, and step S104 may be continuously repeated after step S104. With this method, image projection according to the present technology can be performed in real time. Alternatively, step S102, step S103, and step S104 may be repeated in a case where three-dimensional positions of the image display light diffraction optical elements 150 and/or the two eyes are changed. With this method, for example, an amount of electric power used by the image projection apparatus can be suppressed.

In step S105, the image projection apparatus 110 ends the image projection processing according to the present technology.

The above processing can be performed by, for example, the image projection apparatus according to the present technology. As for more detailed operation of respective constituent elements of the image projection apparatus in the above-described respective steps, refer to "1. First Embodiment (Image Projection System)" described above.

Note that the present technology can also adopt configurations as follows.

[1] An image projection system including:

an image projection apparatus that includes:

a positional information acquisition unit that acquires three-dimensional positional information of an image display light diffraction optical element provided in front of each of two eyes;

an image display light adjustment unit that adjusts projected image display light on the basis of the three-dimensional positional information acquired by the positional information acquisition unit; and one projection optical system that can project image display light to a region covering the two eyes and projects, toward the image display light diffraction optical elements, the image display light adjusted by the image display light adjustment unit; and the image display light diffraction optical elements separated from the image projection apparatus and arranged in front of the two eyes, respectively.

[2] The image projection system recited in [1], in which the image display light diffraction optical element has optical characteristics of: functioning as a lens for light having a wavelength range of the image display light; and transmitting light having a wavelength out of the wavelength range.

[3] The image projection system recited in [1] or [2], in which the projection optical system irradiates the two eyes with the image display light by a magnification optical system.

[4] The image projection system recited in [1] or [2], in which the projection optical system condenses the image display light in a vicinity of a pupillary orifice and irradiates a retina with the image display light so as to obtain a Maxwell view.

[5] The image projection system recited in any one of [1] to [4], in which the projection optical system divides, into two, a region to which the image display light can be projected, and the two regions cover right and left eyes, respectively.

[6] The image projection system recited in [5], in which the projection optical system includes a wedge plate, a dogleg shape mirror, or a diffraction element as an optical element for the division.

[7] The image projection system recited in any one of [1] to [4], in which the projection optical system divides, into two, a region to which the image display light can be projected, and the two regions cover right and left eyes, respectively, and the projection optical system includes a deflection control unit that deflects the projected image display light.

[8] The image projection system recited in any one of [1] to [7], in which the image display light diffraction optical element is included in a tool adapted to hold the optical element in front of two eyes.

[9] The image projection system recited in [8], in which the tool does not include a projection optical system.

[10] The image projection system recited in any one of [1] to [9], in which the positional information acquisition unit includes an image sensor, and the positional information acquisition unit acquires the three-dimensional positional information on the basis of information acquired by the image sensor.

[11] The image projection system recited in any one of [1] to [10], in which the image display light adjustment unit adjusts the image display light such that different rays of the image display light are projected to the two eyes, respectively.

[12] The image projection system according to any one of [1] to [11], in which the image display light adjustment unit adjusts the image display light on the basis of parallax between the two eyes.

[13] The image projection system according to any one of [1] to [12], in which a user of the image projection system recognizes a three-dimensional position of a presented image by projecting the different rays of the image display light to the two eyes, respectively.

[14] An image projection apparatus including:

a positional information acquisition unit that acquires three-dimensional positional information of an image display light diffraction optical element provided in front of each of two eyes;

an image display light adjustment unit that adjusts projected image display light on the basis of the three-dimensional positional information acquired by the positional information acquisition unit; and one projection optical system that can project the image display light to a region covering two eyes and projects, toward the image display light diffraction optical elements, the image display light adjusted by the image display light adjustment unit.

[15] An image display light diffraction optical element used to diffract image display light and make the image display light reach each of two eyes, in which the image display light is projected from an image projection apparatus that includes: a positional information acquisition unit that acquires three-dimensional positional information of the image display light diffraction optical element provided in front of each of the two eyes; an image display light adjustment unit that adjusts projected image display light on the basis of the three-dimensional positional information acquired by the positional information acquisition unit; and one projection optical system that can project the image display light to a region covering the two eyes and projects, toward the image display light diffraction optical elements, the image display light adjusted by the image display light adjustment unit, in which the image display light diffraction optical elements are separated from the image projection apparatus and arranged in front of the two eyes, respectively.

[16] A tool including an image display light diffraction optical element used to diffract image display light and make the image display light reach each of two eyes, in which the image display light is projected from an image projection apparatus that includes: a positional information acquisition unit that acquires three-dimensional positional information of the image display light diffraction optical element provided in front of each of two eyes; an image display light adjustment unit that adjusts the projected image display light on the basis of the three-dimensional positional information acquired by the positional information acquisition unit; and one projection optical system that can project the image display light to a region covering the two eyes and projects, toward the image display light diffraction optical elements, the image display light adjusted by the image display light adjustment unit, in which the tool is separated from the image projection apparatus and adapted to hold the optical element in front of the two eyes.

[17] An image projection method including:

a positional information acquisition process of acquiring three-dimensional positional information of an image display light diffraction optical element provided in front of each of two eyes;

an image display light adjustment process of adjusting projected image display light on the basis of the three-dimensional positional information acquired in the positional information acquisition process; and a projection process of projecting the image display light from one projection optical system toward the image display light diffraction optical elements within a region covering the two eyes, the image display light having been adjusted in the image display light adjustment process, in which the image display light diffraction optical elements are separated from the image projection apparatus and arranged in front of the two eyes, respectively.

REFERENCE SIGNS LIST

100 Image projection system
110 Image projection apparatus
111 Positional information acquisition unit
112 Projection optical system
113 Control unit
114 Image display light adjustment unit
115 Optical detection device
116 Picture image processing unit
150 Image display light diffraction optical element
151 Tool

The invention claimed is:

1. An image projection system comprising:
   an image projection apparatus including:
   a positional information acquisition unit configured to acquire three-dimensional positional information of an image display light diffraction optical element provided in front of each of two eyes, wherein the three-dimensional positional information includes a distance from the image projection apparatus to the image display light diffraction optical elements;
   an image display light adjustment unit configured to adjust projected image display light on a basis of the three-dimensional positional information acquired by the positional information acquisition unit; and
   one projection optical system that can project the image display light to a region covering the two eyes and configured to project, toward the image display light diffraction optical elements, the image display light adjusted by the image display light adjustment unit; and
   the image display light diffraction optical elements separated from the image projection apparatus and arranged in front of the two eyes, respectively.

2. The image projection system according to claim 1, wherein the image display light diffraction optical element has optical characteristics of: functioning as a lens for light having a wavelength range of the image display light; and transmitting light having a wavelength out of the wavelength range.

3. The image projection system according to claim 1, wherein the projection optical system irradiates the two eyes with the image display light by a magnification optical system.

4. The image projection system according to claim 1, wherein the projection optical system condenses the image display light in a vicinity of a pupillary orifice and irradiates a retina with the image display light so as to obtain a Maxwell view.

5. The image projection system according to claim 1, wherein the projection optical system divides, into two, a region to which the image display light can be projected, and the two regions cover right and left eyes, respectively.

6. The image projection system according to claim 5, wherein the projection optical system includes a wedge plate, a dogleg shape mirror, or a diffraction element as an optical element for the division.

7. The image projection system according to claim 1, wherein
   the projection optical system divides, into two, a region to which the image display light can be projected, and the two regions cover right and left eyes, respectively, and
   the projection optical system includes a deflection control unit that deflects the projected image display light.

8. The image projection system according to claim 1, wherein the image display light diffraction optical element is included in a tool adapted to hold the optical element in front of two eyes.

9. The image projection system according to claim 8, wherein the tool does not include a projection optical system.

10. The image projection system according to claim 1, wherein the positional information acquisition unit includes an image sensor, and the positional information acquisition unit acquires the three-dimensional positional information on a basis of information acquired by the image sensor.

11. The image projection system according to claim 1, wherein the image display light adjustment unit adjusts the image display light such that different rays of the image display light are projected to the two eyes, respectively.

12. The image projection system according to claim 1, wherein the image display light adjustment unit adjusts the image display light on a basis of parallax between the two eyes.

13. The image projection system according to claim 1, wherein a user of the image projection system recognizes a three-dimensional position of a presented image by projecting different rays of the image display light to the two eyes, respectively.

14. An image projection apparatus comprising:
   a positional information acquisition unit configured to acquire three-dimensional positional information of an image display light diffraction optical element provided in front of each of two eyes, wherein the three-dimensional positional information includes a distance from the image projection apparatus to the image display light diffraction optical elements;
   an image display light adjustment unit configured to adjust projected image display light on a basis of the three-dimensional positional information acquired by the positional information acquisition unit; and
   one projection optical system that can project the image display light to a region covering the two eyes and configured to project, toward the image display light diffraction optical elements, the image display light adjusted by the image display light adjustment unit.

15. An image display light diffraction optical element used to make image display light reach each of two eyes, in which the image display light is projected from an image projection apparatus that includes:
   a positional information acquisition unit configured to acquire three-dimensional positional information of the image display light diffraction optical element provided in front of each of the two eyes, wherein the three-dimensional positional information includes a distance from the image projection apparatus to the image display light diffraction optical elements;

an image display light adjustment unit configured to adjust projected image display light on a basis of the three-dimensional positional information acquired by the positional information acquisition unit; and one projection optical system that can project the image display light to a region covering the two eyes and configured to project, toward the image display light diffraction optical elements, the image display light adjusted by the image display light adjustment unit, wherein the image display light diffraction optical elements are separated from the image projection apparatus and arranged in front of the two eyes, respectively.

16. A tool comprising an image display light diffraction optical element used to diffract image display light and make the image display light reach each of two eyes, in which the image display light is projected from an image projection apparatus that includes:

a positional information acquisition unit configured to acquire three-dimensional positional information of the image display light diffraction optical element provided in front of each of the two eyes, wherein the three-dimensional positional information includes a distance from the image projection apparatus to the image display light diffraction optical elements;

an image display light adjustment unit configured to adjust projected image display light on a basis of the three-dimensional positional information acquired by the positional information acquisition unit; and one projection optical system that can project the image display light to a region covering the two eyes and configured to project, toward the image display light diffraction optical elements, the image display light adjusted by the image display light adjustment unit, wherein the tool is separated from the image projection apparatus and adapted to hold the optical element in front of the two eyes.

17. An image projection method comprising:

a positional information acquisition process of acquiring three-dimensional positional information of an image display light diffraction optical element provided in front of each of two eyes, wherein the three-dimensional positional information includes a distance from an image projection apparatus to the image display light diffraction optical elements;

an image display light adjustment process of adjusting projected image display light on a basis of the three-dimensional positional information acquired in the positional information acquisition process; and a projection process of projecting the image display light from one projection optical system toward the image display light diffraction optical elements within a region covering the two eyes, the image display light having been adjusted in the image display light adjustment process, wherein the image display light diffraction optical elements are separated from the image projection apparatus and arranged in front of the two eyes, respectively.

* * * * *